United States Patent
Wodetzki et al.

(10) Patent No.: US 12,211,114 B2
(45) Date of Patent: *Jan. 28, 2025

(54) MACHINE EVALUATION OF CONTRACT TERMS

(71) Applicant: Coupa Software Incorporated, San Mateo, CA (US)

(72) Inventors: Jamie Wodetzki, Wellesley, MA (US); Kevin N. Jansz, Thornbury (AU); Evan D. Greensmith, Belgrave (AU); Justin M. Lipton, Gardenvale (AU); Marco Altieri, London (GB)

(73) Assignee: Coupa Software Incorporated, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,970

(22) Filed: Nov. 14, 2023

(65) Prior Publication Data

US 2024/0087067 A1    Mar. 14, 2024

Related U.S. Application Data

(63) Continuation of application No. 17/819,623, filed on Aug. 13, 2022, now Pat. No. 11,861,751, which is a
(Continued)

(51) Int. Cl.
*G06Q 50/18* (2012.01)
*G06F 15/76* (2006.01)
(Continued)

(52) U.S. Cl.
CPC ........... *G06Q 50/188* (2013.01); *G06F 15/76* (2013.01); *G06F 18/2431* (2023.01);
(Continued)

(58) Field of Classification Search
None
See application file for complete search history.

(56) References Cited

U.S. PATENT DOCUMENTS

2002/0111922 A1    8/2002  Young et al.
2004/0088333 A1    5/2004  Sidman
(Continued)

FOREIGN PATENT DOCUMENTS

WO    WO-0188819 A1 * 11/2001    ............. G06Q 30/06

OTHER PUBLICATIONS

Ikonomakis, Text Classification Using Machine Learning Techniques, WSEAS Transactions on Computers, Issue 8, vol. 4, Aug. 2005, pp. 966-974 (Year: 2005).*
(Continued)

*Primary Examiner* — Michael Young
(74) *Attorney, Agent, or Firm* — Baker Botts L.L.P.

(57) ABSTRACT

Embodiments of the present disclosure provide a method that may include defining an object model containing a structural representation of events and artefacts through which contracts are created, changed, and brought to an end. The method may include accessing a machine learning classifier comprising a plurality of rule sets. The method may include applying the plurality of rule sets to one or more words of each corresponding contract document. The method may include linking identified one or more core attributes and one or more words of each corresponding contract document to an applicable object of the object model, determining prevailing terms of each corresponding contract document, and evaluating contract data variables and assigning a contract data risk value to one or more of contract data values. The method may include alerting a user when a contract risk exceeds a threshold value.

20 Claims, 26 Drawing Sheets

Related U.S. Application Data continuation of application No. 15/922,725, filed on Mar. 15, 2018, now Pat. No. 11,416,956.

(60) Provisional application No. 62/471,653, filed on Mar. 15, 2017.

(51) Int. Cl.

| | | |
|---|---|---|
| *G06F 18/2431* | (2023.01) | |
| *G06N 5/022* | (2023.01) | |
| *G06N 5/046* | (2023.01) | |
| *G06N 20/00* | (2019.01) | |
| *G06Q 10/10* | (2023.01) | |
| *G06V 30/10* | (2022.01) | |
| *G06V 30/196* | (2022.01) | |
| *G06V 30/413* | (2022.01) | |

(52) U.S. Cl.
CPC ............. *G06N 5/022* (2013.01); *G06N 5/046* (2013.01); *G06N 20/00* (2019.01); *G06Q 10/10* (2013.01); *G06V 30/10* (2022.01); *G06V 30/1985* (2022.01); *G06V 30/413* (2022.01)

(56) References Cited

U.S. PATENT DOCUMENTS

| | | |
|---|---|---|
| 2005/0182736 A1 | 8/2005 | Castellanos |
| 2008/0015880 A1 | 1/2008 | Freedenberg et al. |
| 2008/0021754 A1 | 1/2008 | Horn et al. |
| 2008/0201233 A1 | 8/2008 | Schellinger et al. |
| 2010/0063892 A1* | 3/2010 | Keronen ............... G06Q 30/06 705/26.1 |
| 2011/0078074 A1 | 3/2011 | Lipman |
| 2017/0011313 A1 | 1/2017 | Pochert |
| 2018/0197128 A1 | 7/2018 | Carstens |

OTHER PUBLICATIONS

International Application Serial No. PCT/US18/22739, International Search Report and Written Opinion, Mailed Jul. 20, 2018, 10 Pages.

International Application Serial No. PCT/US18/22739, Invitation To Pay Additional Fees And, Where Applicable, Protest Fee, Mailed May 25, 2018, 2 Pages.

Ikonomakis, Text Classification Using Machine Learning Techniques, WSEAS Transactions on Computers, Issue 8, vol. 4, Aug. 2005, pp. 966-974.

* cited by examiner

| Corp-us ID | Clause Text | Legal Classification | Subject Classification | Party Direction | Timing Contingency | Other Contingency | Contextual Dependency |
|---|---|---|---|---|---|---|---|
| 1 | Supplier shall indemnify, defend and hold harmless Customer from and against all losses arising from or caused by Supplier's gross negligence or willful misconduct, except to the extent that Supplier was acting under Customer's direction or instructions. | #Obligation #Indemnification | #AnyLoss #GrossNegligence #WilfulMisconduct | #FromSupplier #ToCustomer | None | #CarveOutDirected by Customer | None |
| 2 | Subject to payment by Customer, all Deliverables and all intellectual property rights therein shall become the sole and exclusive property of Customer, provided that Supplier retains ownership of Supplier Material and any enhancements thereto during the performance of the Services. | #Transfer | #Deliverables #IntellectualProperty #TangibleProperty | #FromSupplier #ToCustomer | None | #CarveOutSupplierMaterials #SubjectToPayment | #DefinitionOfDeliverables #DefinitionOfSupplierMaterial |

FIG. 4A

| Corpus ID | Clause Text | Legal Classification | Subject Classification | Party Direction | Timing Contingency | Other Contingency | Contextual Dependency |
|---|---|---|---|---|---|---|---|
| 3 | Notwithstanding any other provision of this agreement, Supplier's total aggregate liability to Customer under this agreement or in any way arising from the Services shall be limited to an amount equal to the total fees paid or payable by Customer over the preceding 3 years, provided that this clause shall not limit Supplier's liability for breach of confidence, death, bodily injury, gross negligence of fraud. | #LimitationOrExclusion | #AggregateLimit #CappedTrailingFeeMultiple #Trailing36Months #Multiple1X | #BySupplier | None | #CarveOutConfidentiality #CarveOutDeath #CarveOutPersonalInjury #CarveOutGrossNegligence #CarveOutFraud | |
| 4 | If Supplier knows or has reason to believe that any of its computer systems or data storage facilities has been penetrated or compromised by any unauthorized person then Supplier shall immediately notify Customer of the event or suspected event and the extent to which Customer data is or may affected. | #Obligation | #ReportingAndDisclosure #DataBreach | #FromSupplier #ToCustomer | #EventTriggered #Immediately | | |

FIG. 4B

| Cor pus ID | Clause Text | Legal Classification | Subject Classification | Party Direction | Timing Contingency | Other Contingency | Contextual Dependency |
|---|---|---|---|---|---|---|---|
| 5 | This agreement (this "Agreement"), effective as February 14, 2005 (the "Effective Date"), is entered into by and between Alpha Communications Group, Inc., with offices located at 99 Main Street, Dallas, Texas (hereinafter referred to as "Alpha"), and Bravo Services Limited, with offices located at No 7, Beta Tower, 1st Floor Tech Park, Bangalore, India (hereinafter referred to as "Bravo"). | #AgreementWording | #EffectiveDate #PartyNames #PartyAddresses | | #SpecificDate | | |
| 6 | [Supplier] agrees to provide to [Customer] the services as they are described on the statements of work attached hereto ("Services") as such statements of work may be executed from time to time by both Parties to this Agreement (each a "Statement of Work"). Each Statement of Work shall be consecutively numbered and shall specifically incorporate this Agreement by reference. Services shall be proved in accordance with the provisions of this Agreement and the applicable Statement of Work. | #Obligation #OrderMechanism | #Services #Order #Performance | #FromSupplier #ToCustomer | #EventTriggered #OnExecution | | #DefinitionOfServices |

FIG. 4C

| Issue-Specific Scores | Max | ADR_RiskScore | 3 | Assignability_RiskScore | 5 | CounterpartyCountry_RiskScore | 5 | CreditSupport_RiskScore | 3 | Currency_RiskScore | 5 | EmployeeNoncompete_RiskScore |
|---|---|---|---|---|---|---|---|---|---|---|---|---|
| | | | 2 | | 3 | | 5 | | 3 | | 5 | |
| | | Mandatory Arbitration | 2 | By Them | 5 | North Korea, Iran, Sudan, Syria | 5 | Yes On Us | 3 | Exotic | 5 | No |
| | | Mandatory Mediation & Arbitration | 2 | Other | 3 | Everyone Else | 5 | Other | 1 | Minor | 0 | Yes |
| | | Other | 2 | By Them Qualified | 2 | OECD Country | 4 | Yes On Us - Qualified | 0 | Major | | |
| | | Not Specified | 1 | No | 2 | | 3 | No | | | | |
| | | Mandatory Mediation | 0 | Not Specified | 2 | | 2 | Yes Mutual | | | | |
| | | | | Yes Mutual | 2 | | 1 | Yes Mutual - Qualified | | | | |
| | | | | Yes Mutual Qualified | 1 | | 0 | Yes On Them | | | | |
| | | | | By Us Qualified | 1 | | 0 | Yes On Them - Qualified | | | | |
| | | | | By Us | 0 | | | | | | | |
| Comments | | | | | | | | | | | | |
| These scores are added based on interview and divided by the max risk score to create a percentage risk score | | Anything with mandatory arbitration is risky and other needs to assume that arbitration is a possibility. | | Unilateral assignment by them is most risky, and unilateral by us is least risky (for us), with mutual and qualified rights to assign falling in between | | A handful of "rogue states" are most risky, while OECD states are least risky, with everyone else falling in between | | Credit support covers things like obligations to provide guarantees, collateral, security deposits, etc. Most risky when this falls on us, and least risky when this has been provided by them | | FX risk penalty for non-major currency exposures, based on general assumption that major currencies (USD, EUR, GBP, JPY, CHF) are highly liquid and stable, minors (AUD, CAD, NZD, DKK, NOK, SEK) slightly less so, and exotics (everything else) generally carrying higher liquidity risk | | Higher risk of intel leaking to competitors when there is no employee non-compete clause |

Fig. 20A

| Issue-Specific Scores | Max | 3 | Employee OtherComp_RiskScore | 1 | Employee VariableComp_RiskScore | 3 | Exclusivity_RiskScore | 21 | Governance_RiskScore | 3 | Indem-nification_RiskScore | 3 | IntellectualProperty Ownership_RiskScore |
|---|---|---|---|---|---|---|---|---|---|---|---|---|---|
| | | 3 | Yes | 1 | Yes | 3 | Yes To Them | 21 | Any governance contract | 3 | Yes On Us | 3 | Them |
| | | 0 | No | 0 | No | 3 | Other | | | 3 | Other | 3 | Other |
| | | | | | | 2 | Yes Mutual | | | 2 | Yes Mutual | 2 | Joint |
| | | | | | | 1 | No | | | 1 | No | 1 | Split |
| | | | | | | 0 | Yes To Us | | | 0 | Yes On Them | 1 | No |
| | | | | | | | | | | | | 0 | Us |
| | | | | | | | | | | | | | |
| | | | | | | | | | | | | | |
| Comments | | | | | | | | | | | | | |
| These scores are added based on interview and divided by the max risk score to create a percentage risk score | | | Employment contracts that include "other" forms of compensation may include options, shares, etc, which is more risky than simple financial comp. | | Any variable comp will be more complex (and slightly riskier) than simple base comp | | Giving away exclusivity is most risky | | Given the possible complexity of "governance" contracts the simple assumption is that all forms of governance agreement will have a high base risk | | Unilateral obligations on us to indemnify are most risky. | | IP ownership to them (or other) is most risky. Joint ownership is next due to need for agreement over exploitation. Split ownership is generally better in terms of clear rights to exploit. Silence is slightly risky due to possible uncertainty. Ownership by us is lowest risk. |

Fig. 20B

| Issue-Specific Scores | Max | | KeyPerson_RiskScore | | LiabilityLimitation_RiskScore_BuySide | | LiabilityLimitation_RiskScore_SellSide | | MFN_RiskScore | | NonDisclosure_RiskScore | | OurStandardOfCare_RiskScore |
|---|---|---|---|---|---|---|---|---|---|---|---|---|---|
| | | 2 | | 4 | | 5 | | 3 | | 2 | | 2 | |
| | | 2 | Yes On Us | 4 | Capped Trailing Fees Multiple & Beneficiary is THEM or MUTUAL or OTHER | 5 | Uncapped | 3 | Yes To Them | 2 | Their Info Only | 2 | Fiduciary OR Utmost Good Faith |
| | | 2 | Other | 3 | Capped TCV Multiple & Beneficiary is THEM or MUTUAL or OTHER | 5 | Capped but Beneficiary is THEM or OTHER | 3 | Other | 2 | Other | 0 | Any other standard |
| | | 2 | Yes Mutual | 2 | Capped Other & Beneficiary is THEM or MUTUAL or OTHER | 3 | Capped Other & Beneficiary is US or MUTUAL | 2 | Yes Mutual | 2 | None | | |
| | | 0 | Not Specified | 2 | Capped Fixed Amount & Beneficiary is THEM or MUTUAL or OTHER | 3 | Capped Fixed Amount & Beneficiary is US or MUTUAL | 0 | To Us | 1 | Mutual | | |
| | | 0 | Yes On Them | 0 | Capped but Beneficiary is US | 1 | Capped TCV Multiple & Beneficiary is US or MUTUAL | 0 | No | 0 | Our Info Only | | |
| | | | | 0 | Uncapped | 0 | Capped Trailing Fees Multiple & Beneficiary is US or MUTUAL | | | | | | |
| | | | | | | | | | | | | | |
| Comments | | | | | | | | | | | | | |
| These scores are added based on interview and divided by the max risk score to create a percentage risk score | | | Simple assumption that key person obligations on us (unilateral, mutual or other) carry some risk since we now have key person performance risk. | | On buy side, best case for us is no cap on their liability, and the tighter the cap, the riskier it becomes. | | On sell side, best case for us is a trailing fees multiple, and worst case is where our liability is uncapped | | MFN risk covers price-matching and similar obligations, which is highest when given unilaterally by us to them | | Safe NDA options are protection for us or mutual protection. Other options are higher risk because our info may not be protected. | | Risky when we have a very high contractual duty of care imposed on us. |

Fig. 20C

| Issue-Specific Scores | Max | Pricing_Risk Score_BuySide | 3 | Pricing_Risk Score_SellSide | 2 | Repeating Representations_ RiskScore | 2 | Restrictive Covenants_ RiskScore | 2 | Termination ForCause_ RiskScore | 2 | Termination ForChangeOfControl RiskScore | 2 | Termination ForConvenience_ RiskScore | 3 |
|---|---|---|---|---|---|---|---|---|---|---|---|---|---|---|---|
| | | Uncapped Adjustment | 4 | Evergreen for Them & No Price Adjust | 3 | By Us | 2 | Yes On Us | 2 | Yes By Them | 2 | Yes By Them | 2 | Yes By Them | 3 |
| | | Auto Annual Escalator | 3 | Anything else | 0 | Other | 2 | Other | 2 | No | 2 | Other | 2 | Other | 3 |
| | | Not Specified | 2 | | | Mutual | 2 | Yes Mutual | 2 | Yes Mutual | 1 | Yes Mutual | 1 | Yes Mutual | 2 |
| | | Capped Other | 2 | | | No | 1 | No | 0 | Yes By Us | 0 | No | 0 | No | 0 |
| | | Capped CPI | 1 | | | By Them | 0 | Yes On Them | 0 | | | Yes By Us | 0 | Yes By Us | 0 |
| | | Not Allowed to Adjust | 0 | | | | | | | | | | | | |
| | | | | | | | | | | | | | | | |
| | | | | | | | | | | | | | | | |
| Comments | | | | | | | | | | | | | | | |
| These scores are added based on interview and divided by the max risk score to create a percentage risk score | | On buy side, the more freedom they have to increase price, the higher the risk. | | On sell-side, the major risk factor is an evergreen contract at their discretion with no mechanism for price increase by us | | Repeating reps are risky from an operational perspective because they need to be monitored on an ongoing basis to avoid "making" a false representation due to some change in circumstance | | Restrictive covenants cover a range of promises NOT to do things, and are risky for us in terms of operational freedom | | Termination risks are higher for rights available only to them | | Termination risks are higher for rights available only to them | | Termination risks are higher for rights available only to them | |

Fig. 20D

MACHINE EVALUATION OF CONTRACT TERMS

This application claims the benefit under 35 U.S.C. § 120 as a continuation of application Ser. No. 17/819,623, filed Aug. 13, 2022, which is a continuation of application Ser. No. 15/922,725, filed Mar. 15, 2018, now U.S. Pat. No. 11,416,956, which claims the benefit of provisional application 62/471,653, filed Mar. 15, 2017, the entire contents of which are hereby incorporated by reference as if fully set forth herein. Applicant hereby rescinds any disclaimer of claim scope in the application(s) of which the benefit is claimed and advises the USPTO that the present claims may be broader than any application(s) of which the benefit is claimed.

BACKGROUND

Parties use contracts to define their rights vis-à-vis other contracting parties to a transaction or series of transactions. Modern business organizations have dozens, hundreds or even thousands of contracts that need to be monitored, approved, reviewed, and performed. Contracts can be voluminous and may comprise pages upon pages of rights, obligations, relationships, restrictions, and deadlines. The volume of transactions and terms are difficult to track. A difficulty for a party is to ensure timely visibility into a contract portfolio, to gain a comprehensive understanding of a party's contractual risk, and to empower the users of those contracts with tools that support contract management best practices.

Utilizing computer software to monitor, analyze, and provide visibility into contractual risks, rights, and processes across a party's existing portfolio of contracts is problematic. Primarily three problems present themselves when trying to use automated logic to identify and assess contractual terms.

The first problem is the Words-to-Data Problem. Contracts are typically expressed as words, with very few constraints or rules about the composition of those words. Not only is the wording highly variable, but the formatting and layout is variable, and this can change the meaning for any given set of words. In short, contracts are designed for consumption by expert human readers looking at words on a page. This makes it extremely challenging to translate them into data that can be processed by a machine.

Another problem is the Idiosyncrasy Problem. Because contracts affect such diverse industries, activities, relationships, and scenarios, they come in many "types" and may contain a wide range of industry, regional and company-specific jargon. Words and terminology used in one contract type may appear different from those used in another type. This makes it extremely difficult to compare contracts across an enterprise portfolio, for example, for contractual risk assessments.

Another problem is the Prevailing Terms Problem. There is an important time dimension to contracts. Contracts all start with a single, clean set of words, but over time, many contracts change, through amendments, assignments, renewals, and other events. Previous solutions do not properly capture the time dimension of a series of contracts or a master contract followed by a series of subcontracts, orders, amendments, and other changes. This is further complicated by the use of master, standalone, sub-contract, principal-agent, and other structures that affect the question: is this one contract or many? All of which makes it very hard to track and understand the "prevailing terms" or "prevailing language" of a contract.

For these reasons, in the past, contract evaluation has only been accomplished by extracting the data manually by human experts, which is an expensive, time-consuming, and error-prone task that would only yield a portion of the necessary data. Therefore, there is a need in the art for a system that uses machine evaluation of contract documents to quickly and inexpensively present contract portfolio data in an accurate, organized, searchable and time-organized manner.

SUMMARY

Methods and systems are provided herein for machine representation and tracking of contract terms over the lifetime of a contract. The methods and systems may further include defining an object model containing a structural representation of the events and artefacts through which contracts are created, changed and brought to an end, the object model having at least three object types: contract objects, contract transaction objects and contract document objects; associating the contract objects with one or more contract transaction objects corresponding to one or more actions taken within the contract, wherein at least one of the contract transaction objects is of one of the following types: Create Transaction, Terminate Transaction, Amend Transaction, Order Transaction, Renew Transaction, Assign Transaction and Novate Transaction; associating contract document objects containing a corresponding contract document with one or more corresponding contract transaction objects; evaluating words of each contract document to identify whether the words contain one or more core attributes pertaining to details of the contract, wherein the one or more core attributes may comprise one or more of legal classifications, subject classifications, party directions, timing contingencies, conditionalities or contextual dependencies; evaluating the words of each contract document containing legal classifications to determine a type of the legal classification, wherein at least one of the types of legal classification is an obligation, a right, a representation, an act or deed, and a definition; linking the identified core attributes and the words of each contract document to and applicable objects of the object model; determining prevailing terms of the contract by evaluating all child contract transaction objects, and the data contained therein, chronologically to build a single set of terms for storage in the contract object and updating the single set of terms as those terms are modified by active, chronologically-later contract transaction objects; storing the prevailing terms in the contract object; and re-performing the determining and storing steps, above, each time that a change is made to a contract transaction object and each time that a new contract transaction object is associated with the contract object.

In other embodiments the methods and systems provide determining prevailing terms of the contract by evaluating all child contract transaction objects chronologically to build a single set of terms for storage in the contract object and updating the single set of terms as those terms are modified by active, chronologically-later contract transaction objects comprises; determining prevailing terms of the contract by 1) evaluating all child contract transaction objects chronologically to build a single set of terms for storage in the contract object and updating the single set of terms as those terms are modified by active, chronologically-later contract transaction objects; and 2) not evaluating draft contract transaction objects, terminated contract transaction documents, and rescinded contract transaction objects.

In other embodiments, the methods and systems provide the step of evaluating words of each contract document comprises the step of evaluating each sentence of each contract document.

In other embodiments, the methods and systems provide wherein the step of evaluating words of each contract document comprises the step of evaluating sentence pairs of each contract document.

In embodiments, the methods and systems provide the storing of the prevailing terms in the contract object comprises the step of storing the prevailing terms in the contract object in XML format.

In embodiments, the methods and systems provide the storing of the prevailing terms in the contract object comprises the step of storing the prevailing terms in the contract object in XML format.

In embodiments, the methods and systems provide the storing of the prevailing terms in the contract object comprises the step of storing the prevailing terms in the contract object in a triple store format.

In embodiments, the methods and systems provide the step of calculating a risk score associated with the prevailing terms of the contract.

In embodiments the methods and systems, the object types further comprise project objects, user objects, group objects, workflow objects, organization objects, legal entity objects, and product objects.

In embodiments the methods and systems, the legal classification comprises one of an obligation, a right, a representation, an act, and a definition.

In embodiments, the methods and systems provide the step of evaluating words of each contract document to identify whether the words contain one or more core attributes pertaining to details of the contract comprises associating groups of words with data variables having data variable values that identify one or more of legal classifications, subject classifications, party directions, timing contingencies, conditionalities or contextual dependencies of the contract document.

Additionally, in embodiments, methods and systems for machine identification, representation and tracking of contract terms over the lifetime of a contract are provided that include defining an object model containing a structural representation of the events and artefacts through which contracts are created, changed and brought to an end, the object model having at least three object types: contract objects, contract transaction objects and contract document objects; associating the contract objects with one or more contract transaction objects corresponding to one or more actions taken within the contract; associating contract document objects containing a corresponding contract document with one or more corresponding contract transaction objects; evaluating words of each contract document to identify whether the words contain one or more core attributes pertaining to details of the contract, wherein the one or more core attributes may comprise one or more of legal classifications, subject classifications, party directions, timing contingencies, conditionalities or contextual dependencies; evaluating the words of each contract document containing legal classifications to determine a type of the legal classification, wherein at least one of the types of legal classification is an obligation, a right, a representation, an act or deed, and a definition; linking the identified core attributes and the words of each contract document to an applicable object of the object model; determining prevailing terms of the contract by 1) evaluating all child contract transaction objects chronologically to build a single set of terms for storage in the contract object and updating the single set of terms as those terms are modified by active, chronologically-later contract transaction objects; and 2) not evaluating draft contract transaction objects, terminated contract transaction documents, and rescinded contract transaction objects. storing the prevailing terms in the contract object; and re-performing the determining and storing steps, above, each time that a change is made to a contract transaction object and each time that a new contract transaction object is associated with the contract object.

Additionally, in embodiments, methods and systems for machine recognition of contract terms of a contract and conforming the contract terms to a data model are providing that include a) defining an object model containing a structural representation of the events and artefacts through which contracts are created, changed and brought to an end, the object model having at least three object types: contract objects, contract transaction objects and contract document objects; b) associating the contract objects with one or more contract transaction objects corresponding to one or more actions taken within the contract; c) associating contract document objects containing a corresponding contract document with one or more corresponding contract transaction objects; d) evaluating a contract document using a machine learning algorithm; e) classifying the contract document object with a contract document type according to the machine learning algorithm; f) assigning a confidence score to the contract document object's classified object type based upon the result of the machine learning algorithm; g) if the confidence score is below a predetermined value, using a human expert to review the classified contract document to determine whether the machine learning algorithm properly classified the contract document; and h) providing the result of the human expert's review of the pre-classified contract document to a machine algorithm training corpus for use by the machine learning algorithm to classify future contract documents.

In embodiments, the methods and systems include parsing the contract document into a collection of single sentences; with machine learning algorithm: 1) evaluating the sentences of the contract document to identify whether the sentences contain one or more core attributes pertaining to details of the contract, wherein the one or more core attributes may comprise one or more legal classifications, subject classifications, party directions, timing contingencies, conditionalities or contextual dependencies; and 2) evaluating the sentences of each contract document containing legal classifications to determine a type of the legal classification, wherein at least one of the types of legal classification is an obligation, a right, a representation, an act or deed, and a definition; assigning a confidence score to the evaluated sentences based upon the result of the machine learning algorithm; if the confidence score is below a predetermined value, using a human expert to review the evaluated sentences to determine whether the machine learning algorithm properly evaluated the sentences; and providing the result of the human expert's review of the evaluated sentences to a machine learning algorithm training corpus for use by the machine learning algorithm to evaluate future sentences of contract documents.

In embodiments, the methods and systems provide, if the confidence score was below the predetermined value, reperforming the steps d)-h) to amplify the result of human expert's review on the machine learning algorithm training corpus.

In embodiments, the methods and systems provide anonymizing contract data before presenting the contract data to the human expert.

In embodiments, the methods and systems provide using contract documents are public source documents for the purpose of expanding the training corpus through human expert review.

In embodiments, the methods and systems provide steps evaluating the sentences of contract are repetitively performed on a collection of contract documents until the machine learning algorithm accuracy crosses a desired threshold.

In embodiments, the methods and systems provide for replicating the training corpus.

Additionally, in embodiments, methods and systems for evaluating contract risk the include defining an object model containing a structural representation of the events and artefacts through which contracts are created, changed and brought to an end, the object model having at least three object types: contract objects, contract transaction objects and contract document objects; associating the contract objects with one or more contract transaction objects corresponding to one or more actions taken within the contract; associating contract document objects containing a corresponding contract document with one or more corresponding contract transaction objects, wherein the contract transaction object comprises contract data variables having contract data values; determining prevailing terms of the contract by evaluating all child contract transaction objects to build a single set of contract data variables and values for storage in the contract object; storing the prevailing terms in the contract object; evaluating the contract data variables and assigning a contract data risk value to one or more of the contract data values; evaluating the maximum risk for each contract data variable; and presenting a sum of the contract data risk values for the contract data risk variables and a sum of the maximum contract data risk values for each contract data variable.

In embodiments, the methods and systems include presenting a sum of the contract data risk values for the contract data risk variables and a sum of the maximum contract data risk values for each contract data variable comprising presenting the sum of the contract data risk values for the contract data risk variables and a sum of the maximum contract data risk values for each contract data variable as a quotient.

Additionally, in embodiments, methods and systems for allowing two or more parties to form a contract including defining an object model containing a structural representation of the events and artefacts through which contracts are created, changed and brought to an end, the object model having at least three object types: contract objects, contract transaction objects and contract document objects; associating the contract objects with one or more contract transaction objects corresponding to one or more actions taken within the contract; associating contract document objects containing a corresponding contract document with one or more corresponding contract transaction objects, wherein the contract transaction object comprises contract data variables having contract data values; determining prevailing terms of the contract by evaluating all child contract transaction objects to build a single set of contract data variables and values for storage in the contract object; storing the prevailing terms in the contract object; and recording the prevailing terms of the contract model in a blockchain register of objects, terms and data supported by the object model.

In embodiments, the methods and systems include verifying the parties to the contract against a trusted register of legal entities.

In embodiments, the methods and systems include recording the prevailing terms of the object model in a blockchain contract register.

In embodiments, the methods and systems include tracking events relevant to performance of the contract.

In embodiments, the methods and systems include verifying that a transfer obligation should be executed, executing a transfer of ownership event, and recording the transfer in a transfer event register.

In embodiments, the methods and systems include updating an asset register to record a change of ownership of the asset.

In embodiments, the methods and systems provide contract risk scores are updated in real-time using external data obtained from electronic information sources.

BRIEF DESCRIPTION OF THE FIGURES

FIG. 4A, FIG. 4B, FIG. 4C depict a table describing an implementation of the sentence level data attributes and classifications according to an embodiment;

FIG. 20A, FIG. 20B, FIG. 20C, FIG. 20D detail an example model for scoring contract risk.

DETAILED DESCRIPTION

Figure 1:
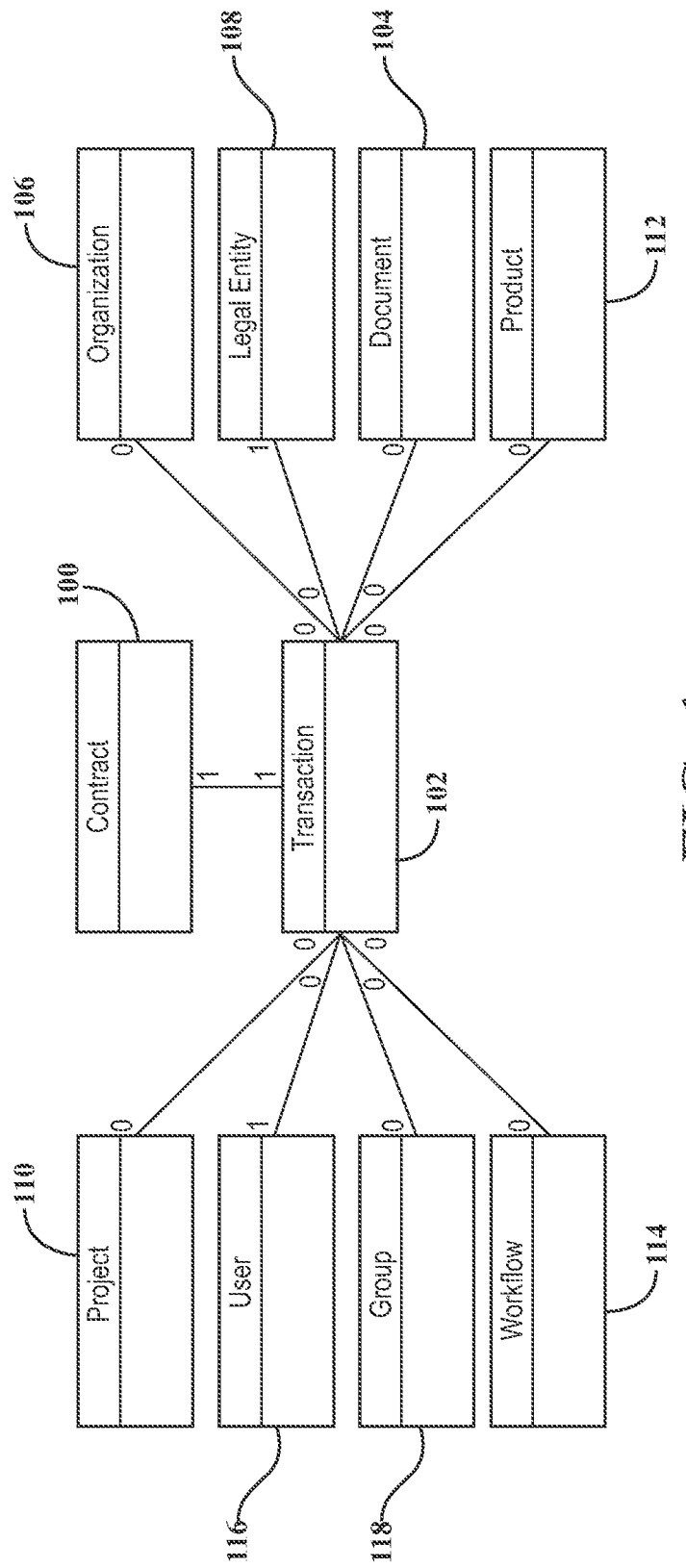
FIG. 1 is a diagram showing the objects in the Universal Contract Model Object model (UCM Object model) according to an embodiment.

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art. The claims should be consulted to ascertain the true scope of the disclosure.

To solve the words-to-data problem and the prevailing terms problem, the present platform has developed a multi-tier contract object model, which breaks contracts into at least three object types and connects them via a series of rules. Contract Documents are one object type, which contain things agreed by the parties, as words that are possibly supplemented by other forms of notation or expression. The words in these contracts can then be linked to Contract Transactions ("Contract Txns"), a second object type, which represent a set of terms in at least one Contract Document at a point in time and reflect a state-change to a contract. Contract Txns reflect the time dimension of a contract, namely, there is at least one at the beginning, and there may be one or more others over time that change the original Txn. There is, in the present platform, a finite set of Txn types, each of which has certain "roll up" rules, such that by evaluating all "active" Txns, a platform can ascertain, at any point in time the prevailing terms of the contract. All Contract Txn objects are children of the third object type, namely the Contract Object. This is to where the prevailing terms are rolled-up, and this object type allows the platform to present to a user the then-current terms of the contract at any point in time Next, gaining visibility into the contracting outcomes reflected in a party's contract portfolio enables that party to protect its business from dangerous contracts by providing users with information about how to improve future contract drafting and negotiation processes and outcomes. A platform that combines automated contract analysis and automated contracting processes allows a party to easily create high quality, low risk documents through an intuitive, interview-driven platform. This lowers costs, reduces bottlenecks, and empowers business users. For example, insights gained through contract portfolio analysis can be used to "harvest" clauses from legacy contracts and automatically feed a clause library. Clauses can be classified and ranked for favorability and risk attributes, and made available to users drafting new agreements, supported by playbook guidance. Machine analysis of contractual outcomes can also be used to derive negotiation patterns, and to apply those patterns into templates and rule-sets for automated drafting. An example would be that analysis shows that all contracts of type A include a clause of type B. This inference is then used by the platform to propose a rule that all templates for new contracts of type A should include clause type B as a mandatory requirement. In one implementation, the template based drafting platform includes a set of drafting rules that are processed by assessing various input facts and using the template rules to generate a draft contract, without expert intervention, which includes clauses and attributes best suited to those facts.

The analysis and scoring of each contract are performed by utilizing software to review each contract and categorize contract terms into the contract object model. The contract object model provides for the categorization of contract terms into many other object types: contract objects, transaction objects, document object, organization objects, legal entity objects, project objects, product objects, workflow objects, user objects and group objects.

The Universal Contract Model ("UCM") (described herein) represents a contract as data via a single contract object and relates that object to one or more contract documents. There are master, standalone, sub-contract and other relationships that affect the question whether there is one contract or many. Second, there is a time dimension where contracts change over time, via amendments, assignments, renewals, and other events. Third, there are very few constraints and rules about the way contracts are expressed, which makes it challenging to translate them into structured relational data.

With this model, virtually any type of contract can be represented in a way that supports accurate analysis of simple high-level terms, down to complex granular terms, without distortion or compromise.

The UCM expresses contracts as actionable data. It addresses two fundamental issues: what the contract is and what the contract says.

Accordingly, there are two fundamental parts to the model. First, the UCM Object Model is a structural representation of the events and artefacts through which contracts are created, changed, and brought to an end. The object model starts with contract documents, which are the usual means for expressing new or amended contract terms. It includes a concept of contract transactions, which is an event by which a contract is changed in some way, and covers the execution of a new contract, an amendment, a work or purchase order, a change order, a renewal, an assignment, a novation, a termination or expiry, and a rescission. Collectively, all signed/active transactions roll up to a single contract object, which records a consolidated view of all those transactions. These three core objects are supplemented by additional objects, including legal entity, organizational, project and workflow objects, amongst others.

Second, the Contract Data Model is a data/semantic representation of the parties, promises and meaning embodied in the terms of any contract. The data model organizes the data inside a contract into certain high level, universal categories, including the parties, the term and termination provisions, the payment and performance provisions, risk allocation provisions, relationship management provisions and other boilerplate terms.

Referring to FIG. 1, the contract object model contains several objects which have unique relationships to one another. A Contract Object 100 is an object for each separate legal contract, derived from its child Transaction Objects (described below). A Contract Object 100 is the sum of its active child Transaction Objects, presenting a single consolidated view of all key terms. Some but not necessarily all transaction properties roll up to the Contract Object 100, e.g., Orders may not roll up every item of data. Every time there is a change at the (active) transaction level, the Contract Object 100 re-evaluates itself from its active child transactions.

TABLE 1

Contract Object

- Contract Display Name*
- Contract ID*
- Contract Status*
  - Draft | Active | Inactive
  - These may break down into sub-statuses
- Master*
  - true | false [false by default]
- Contract Creator
- Contract Owner
- Contract Date Effective
- Contract Date Expiry
- Multi-Contract
  - true | false [false by default]
- Contract Transactions* [example]
  - Transaction ID 1 (Create), Active
  - Transaction ID 2 (Order), Active
  - Transaction ID 3 (Amend), Inactive
  - Transaction ID 4 (Renew), Active
  - Transaction ID 5 (Amend), Draft
- Related Contracts
  - Created From Master: Contract ID
  - Subcontract Of: Contract ID
- Contract Data Details . . . [parties, everything . . . ]

*= required filed in embodiments

A Transaction Object 102 records an event by which a contract changes—a change of state. It starts with a Create Transaction (a new contract), ends with a Terminate Transaction, and in between those events may include Amend, Order, Renew, Assign and Novate Transactions.

When a new contract is first created, this is a create transaction. A create transaction targets a new contract object 100 and indicates whether or not it is a "master". In embodiments, at the time it first becomes active, the contract object will inherit all of its terms from the create transaction.

An order transaction may only target a master contract. It is designed to cover things like purchase orders, work orders, statements of work, trade confirmations, etc., which are documented and agreed over time. Orders inherit terms from, and add detail to the terms of, a master contract, but should not change most of the master terms (which is what an amendment transaction is for). However, the payment and performance obligations of orders do typically roll up, cumulatively, to the master. The total contract value of a master, for example, is calculated as the sum of all orders that are (or were) active.

Amend, Renew, Assign and Novate transactions are all examples where something about the existing contract terms will be changed. Renew, Assign and Novate are very specific types of change: Renew changes the expiry date; Assign and Novate change the parties (with different timing). Amend covers every other type of change to the terms of the contract. When an Amend transaction becomes effective and active, it will trigger changes to the object it targets. An Amendment might target a Contract generally, or it might target a specific transaction like an Order, and in some cases, it might be a complete restatement of all the terms of the Contract or Order (e.g., an "Amended and Restated" contract). It is also possible for Amendments to have expiry dates (e.g., a short-term endorsement to change terms in an insurance contract). When an amendment expires, the contract object needs to recalculate itself from the transactions that remain in effect.

Finally, terminate transactions bring contracts, or specific transactions, to an end. A variant of terminate is a rescind transaction, which brings something else (contract as a whole or specific transaction) to an end as if it had never happened.

TABLE 2

Transaction Object

- Transaction Display Name*
- Transaction ID*
- Target Objects*
  - Contract ID | Transaction ID
  - The object directly targeted by this Transaction
- Transaction Status*
  - Draft | Active | Inactive
  - These may break down into sub-statuses
- Transaction Type*
  - Create | Amend | Order | Renew | Assign | Novate | Terminate | Rescind
- Master
  - true | false
  - Typically applies to Create Transactions only
- Restatement
  - true | false
  - Typically applies to Amend, Order, Renew, Assign & Novate Transactions only
- Transaction Creator
- Transaction Owner
- Transaction Date Effective
- Transaction Date Expiry

*= required filed, in embodiments

A Document Object 104 embodies one or more Contract Transactions. In a typical case, a single Contract Document will record a single Transaction, for example, where one document creates one new, simple, two-party (bilateral) contract. But it is not uncommon for a contract document to record more than one Transaction, for example, where a new contract is created (a Create Transaction) but includes a clause whereby the parties agree to terminate a previous contract (a Terminate Transaction).

A Document Object 104 needs an attribute indicating whether it is the executed version (not a draft or copy). Contract Documents will typically embody a single Transaction (e.g., a single doc creates an NDA, or a single doc amends a master agreement). Contract Documents may embody multiple Transactions related to the same Contract Object 100 (e.g., a single document which creates a new master contract and also contains the first work order).

A Document Object 104 may embody multiple Transactions related to different Contract Objects 100 (e.g., the agent-on-behalf-of-multiple-principals scenario) or a new Contract Document Object 104 which also contains a clause terminating some other contract.

TABLE 3

Document Object

- Document Title*
- Document ID*
- Target Objects*
  - Transaction ID 1
  - Transaction ID 2
  - . . .
  - Transaction ID n
  - The object/s directly targeted by this Document
- Document Status*
  - Draft | Active | Inactive
  - These may break down into sub-statuses TABLE 3-continued Document Object

- Executed*
  - true | false [false by default]
- Document Creator
- Document Owner
- [mime-type, etc . . . ]
- [version info . . . ]

*= required filed, in embodiments

An Organization Object 106 defines internal and external organizational relationships, such as internal "departmental" structures, and external "corporate group" structures.

A Legal Entity Object 108 abstracts and links to separate legal entity objects and has certain benefits including tracking affiliate relationships, current, former, and alternate names, reference numbers and unique IDs.

A Project Object 110 can be used to associate a series of contracts together where they relate to a common project but may or may not have explicit contractual or organizational links. In simple buying and selling transactions, the Project Object 110 may be unnecessary and need not be used. But in major projects with many (seemingly) independent contracts needed to achieve the overall goal, it is useful to link these contracts via one or more Project Objects (e.g., major real estate development, engineering works, etc.). It may also be useful to link Organization Objects 106 and Legal Entity Objects 108 to a Project Object 110, though linking Contract Objects 100 is most critical.

A Product Object 112 can be used to track relationships between "products" (broadly defined) and contracts, and to provide a reference source for "product" information (including price). The "product" object is intended to cover any offering or asset which may be traded or encumbered by a contract, including tangible products/assets (e.g., laptops, trucks, commodities), intangible products/assets (e.g., software, inventions, trademarks), service offerings, and real estate products/assets.

A Workflow Object 114 defines and tracks workflow tasks and approvals, associated with a particular contract, transaction, or document (and possibly other objects).

A User Object 116 tracks a unique user, including various properties, ideally in-sync with a directory service.

A Group Object 118 tracks a group of users, or other Groups, ideally in-sync with a directory service.

Figure 2:
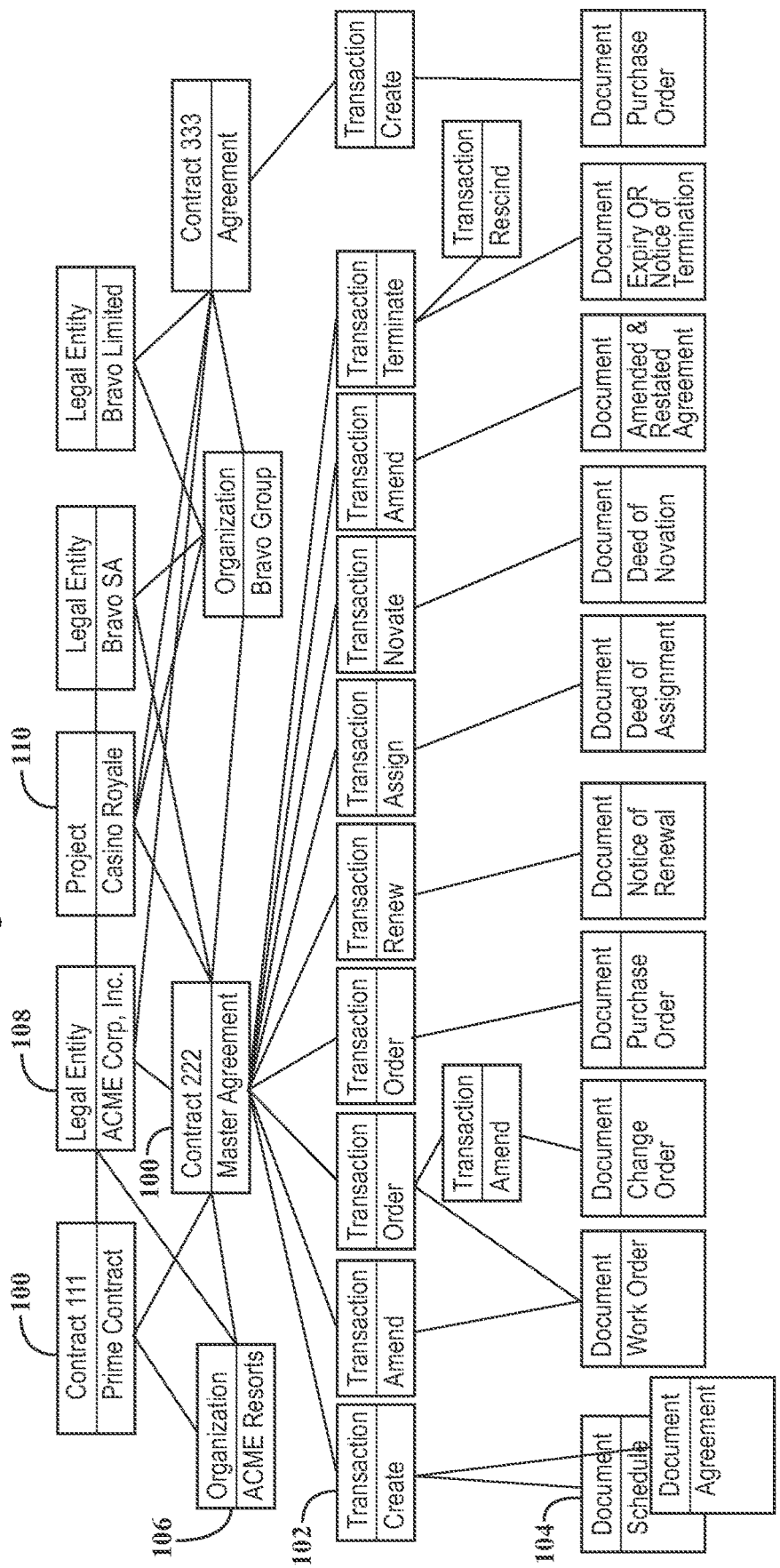
FIG. 2 is a diagram showing an example of objects in an example implementation of the UCM Object model according to an embodiment.

An example of a Contract Object Model is shown in FIG. 2 for a Project Object 110 involving multiple Contract Objects 100, Transaction Objects 102, Document Objects 104, Organization Objects 106, and Legal Entity Objects associated with a single Project Object 110. In the example, the focus is on Contract 222, which is a master contract with a full suite of transaction examples. Most of those transactions link to the same master. Also illustrated is a "purchase order" document, which is characterized as a Create transaction and gives rise to a new Contract 333. This is what would happen if an Order under a Master Contract declared itself to create a separate contract (albeit one that incorporates the terms of the master). Even though new Contract 333 is a separate contract, a relationship to Contract 222 is recorded, showing that it was created from that Master. A link between Contract 222 and Contract 111 is described as a prime contract. This illustrates that Contract 222 may describe itself as a subcontract under Contract 111. The subcontract relationship is understood, but they are nonetheless two separate contracts.

FIG. 2 also illustrates the concept of Legal Entity Objects 108, Organization Objects 106 and Project Objects 110 and examples of the linkages between these objects and Contract Objects 100. At the Transactional Object 102 level, most of the transactions target the Contract Object 100, although there is an example where an amend transaction targets an order transaction (such as a "change order").

Even though there are very few strict rules about the terms a contract can contain, there is some universal data that apply across all contract types, and there are some reliable patterns to the data found in most contracts. The only truly essential data across all contracts is the data that identifies the parties, an effective date, and at least some obligation or promise. In addition to identifying the parties bound to the contract, it will generally have a title, some language around the term, and whether either party has any rights to terminate the contract early. Most contracts also contain certain terms designed to allocate risk between the parties (e.g., limitation on liability, indemnities, representations, and warranties), and terms designed to manage the relationship between the parties, including what happens when the relationship is strained and there may be disputes to resolve. For transactional contracts, where something is being bought and sold, there will be set of performance and payment obligations.

Figure 3:
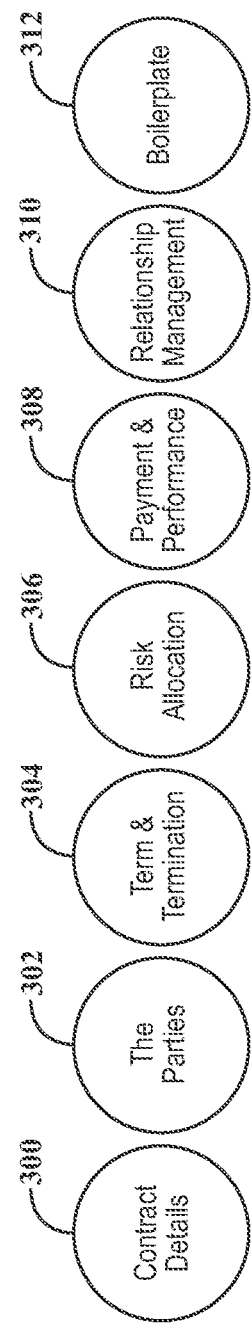
FIG. 3 is a diagram showing the data types contained in the UCM Object model according to an embodiment.

Referring to FIG. 3, the Universal Contract Model organizes contractual data into a set of major categories: Contract details 300, data 302, term and termination data 304, risk allocation data 306, payment and performance data 308, relationship management data 310 and boilerplate data 312. The contract details 300 outline particulars including actual words used in the contract title, whose paper (including, for example, "ours" standard, "ours" negotiated, counterparty paper, industry form standard and industry form negotiated), the contract type (including, for example, confidentiality/nondisclosure agreement, customer/sales, vendor/purchasing, reseller/channel partner, human resources/employment, corporate governance, and finance/trading) and a contract sub-type (including, for example, subtypes of a finance agreement such as custody agreement, fee agreement, International Swaps and Derivatives Association master agreement/credit support annex, loan/credit/facility agreement, investment management agreement, offering memorandum, master repurchase agreement, prime brokerage agreement, guarantee, side letter and the like).

The parties data 302 describes the legal entities party to a contract including name, contact information, role, country, and other details about the party. For example, the "our" details may be described (including details of "our" legal entities that are party to the contract, option to repeat "our" details where we have multiple entities on our side, full legal name, unique ID, country and address, and role), counterparty details, and additional party details (including, for example, details of "additional party" entities which may have a special and distinct role, or may be true "third parties" such as agents and guarantors, option to repeat "additional party" details where there are multiple entities, full legal name, unique ID, country and address, and role).

Term and termination data 304 describes the terms designed for starting and ending a contract, including effective date, term, expiry date, renewal process, and termination with or without cause. The data contains the term of the contract (including, for example, effective date, expiry date, initial term, renewal option, auto-renewal process, and timing constraints on renewal), termination rights (including, for example, termination for convenience, termination for change of control, termination for cause, who has these rights, cure and notice periods, and carve-outs), and more granular details for certain industries (including for example, for the financial services industry, ratings downgrade events, net asset value triggers, and cross-default details).

The risk allocation data 306 describes the terms designed to allocate risk, including exclusions, limitations, representations & warranties, indemnities, guarantees, and insurance, collateral & credit support obligations. The data contains high level risk terms (including, for example, a flag where there are certain terms designed to allocate risk, on "us", counterparty or mutual, including liability caps, obligations to indemnify, credit support obligations, insurance obligations, and force majeure), optional term-by-term detail (including, for example, representations and warranties, credit support detail including guarantees, security, and collateral obligations, insurance detail, exclusions and disclaimers, and waivers), extra details by industry (including, for example, for the financial services industry deep detail into collateral obligations on us and them, initial and variation margin, margin call thresholds and minimum transfer amounts, eligible collateral assets and valuation haircuts on each, segregation, and substitution and re-hypothecation constraints).

The payment and performance data 308 describes the terms designed to detail obligations to perform (provide a good, perform a service, transfer rights, etc.) and make payments. The data contains payment and pricing terms (including, for example, contract value, currencies, discounts, payment terms, price adjustments, set-off rights, most favored nation clauses, etc.) and performance obligations (including, for example, service obligations, delivery obligations, transfer obligations, payment obligations, and restrictive obligations, etc.).

The relationship management data 310 describes the terms designed to define and manage the relationship between the parties, including reporting, disclosure, and dispute resolution processes. The data contains relationship and dispute data (including, for example, assignability, exclusivity, standard of care, governing law, mediation/arbitration, limits on remedies, and jury trial waiver) and notice, reporting & disclosure data (including, for example, periodic reporting obligations, event-triggered notification and disclosure obligations, and timing details for event-triggered obligations).

The boilerplate data 312 describes the terms designed to define and manage common terms including, for example, title, type, status and other meta-info, and other standard "mechanical" terms, including entire agreement, execution, amendment, and definitions.

In one version of the data model, every sentence or phrase of a contract can be treated as a data point, and each such sentence or phrase can be associated with one or more of a series of core attributes, for example:
  legal classification, for example:
    an obligation (positive or negative),
    a right (positive or negative),
    a representation (positive or negative),
    an act or deed, or
    a definition,
  business or subject classification (one or more classifiers as to the subject matter of the clause),
  a party direction (from which party/ies to which other party/ies),
  timing contingency (when does it occur),
  conditionality (or other contingency) (are there any conditions or qualifications on its occurrence), or
  contextual dependency (for example, which contract, contract transaction and contract document did it come from; which other contractual wording, clause, sentence, heading or content does it refer to or depend upon FIG. 4A, FIG. 4B, FIG. 4C illustrate, in an embodiment, an example of contract sentence classification using this multi-attribute classification model.

Table 4 (below) describes an implementation of legal classifications that can be applied to contractual sentences:

TABLE 4

| Legal Classifier | Explanation of legal classifiers |
| --- | --- |
| CoverPage | Some but not all contracts have this, with basic high-level contract details like title and parties, possibly also followed by a Table of Contents, all of which is "window dressing" and not part of the substance of the agreement. |
| AgreementWording | These are the critical anchor words by which the formation of a contractual agreement is declared, which in the classic US style contract will be a long sentence including party names and effective date. In other styles, the agreement wording may look more like a series of headings with party names, then a shorter statement of "The parties agree as follows . . . " |
| Parties | Sometimes the declaration of who the parties are will be in a discrete chunk, rather than embedded in an "agreement wording" sentence. |
| Recitals | Recitals are typically declarations or statements of background facts leading up to the agreement. They may be numbered (for some reason A, B, C is popular) or they may begin with the keyword "Whereas . . . " which can repeat itself at the start of each recital. |
| ExecutionWording | This is typically a declaratory sentence following the main terms and conditions, by which the parties assert that they are executing the agreement and by so doing intend to be bound by it. |

TABLE 4-continued

| Legal Classifier | Explanation of legal classifiers |
| --- | --- |
| ExecutionBlock | A small block of text or table for each party to put their signature, fill in certain other identifying details, and sometimes for companies to affix/stamp a seal. |
| BlankForm | Hanging off the back of a contract may be a series of attachments, schedules, appendices, and exhibits, many of which are incorporated terms, but some of which are simply a sample/template/form showing how a notice, an order or the like should be formatted, and this should not be confused with an actual Order or Notice, since it is just a blank form showing how that should look. |
| SurvivingTerms | There will often be a clause or sentence (or several) indicating that certain terms are intended to survive and continue even after an agreement terminates or expires. |
| InitialTerm | A statement indicating how long the contract is intended to last, which could be a limited time or could be indefinite/ongoing, it may also make reference to the effective date, being the start of the contract. |
| FormationMechanism | Some contracts may be finished and signed but not intended to "start" until some pre-condition is satisfied, a concept lawyers call a "condition precedent to formation", and in this scenario, you may find wording indicating the mechanism by which the "official" formation of the contract will be triggered. |
| ExecutionMechanism | A statement indicating how the parties may execute or sign the contract. |
| NoticeMechanism | A description of the agreed mechanisms for sending notices under the contract. |
| OrderMechanism | A description of the agreed mechanisms for creating Orders under a master agreement. |
| PaymentMechanism | A description of the agreed mechanisms for making payments under an agreement. |
| AmendmentMechanism | A description of the agreed mechanisms for amending an agreement or some part of it. |
| AssignmentMechanism | A description of the agreed mechanism for assigning/transferring the contract (or part of it) to some other party. |
| RenewalMechanism | A description of the agreed mechanism for renewing a contract (or an Order), which can take the form of an option to renew, an automatic renewal mechanism, or nothing at all. |
| TerminationMechanism | A description of the different ways the agreement may be terminated. |
| DisputeMechanism | A description of the agreed mechanism for solving disputes, should they arise, which includes the classic jurisdiction clause (which courts you've agreed to use), and also mediation/arbitration clauses. |
| Interpretation | A statement about how the agreement should be interpreted, including which laws will apply (governing law), which documents/clauses take priority in the case of a conflict or clash, and whether headings, genders, plurals, etc. should be ignored. |
| Obligation | Perhaps the primary "meat" of the contract, where one or more of the parties agrees to do (or not do) something. This will break down into many subcategories. |
| Lease | A present grant of a lease over some property or asset, which is a unique type of right. Not to be confused with an obligation to grant a lease, which is a promise that a party will grant a lease. |
| License | A present grant of a license over some property or asset (most commonly intellectual/intangible property), which is a unique type of right. Not to be confused with an obligation to grant a license, which is a promise that a party will grant a license. |
| Transfer | A present transfer of rights or ownership from one party to another. Not to be confused with an obligation to make a transfer, which is something that will happen rather than is presently deemed to happen. |

TABLE 4-continued

| Legal Classifier | Explanation of legal classifiers |
| --- | --- |
| Right | Language indicating that one or more parties has the right to do something, typically indicated by words like "may", "has the right", "will be entitled to", etc. |
| Waiver | Language indicating that one or more parties has waived or relinquished or given up a right, or agrees not to exercise a right. |
| RepresentationOrWarranty | Assertions of facts or circumstances, typically imposed on one party, forcing it to go on the record declaring that various "good" things are true, or various "bad" things are not true, or that a product or service is up to a certain standard. |
| Acknowledgment | Acknowledgements of facts or circumstances. |
| Disclaimer | Disclaimers of representations or warranties. |
| LimitationOrExclusion | Limitations or exclusions of liability, which may take the form of a hard limit on total liability, or an exclusion of certain types of loss. |
| DefinedTerm | Definition of a term as has a specific meaning, typically using capitalization and quotes/styling to mark the defined term, followed (or sometimes preceded) by its meaning. |
| ReferencedTerms | Words indicating that some external set of terms is incorporated into the contract by reference. |

In another version of the data model, words of the transaction are represented as a serializable tree-based/hierarchical data format (such as XML or JSON) and each sentence/phrase element is associated (marked up) with attributes reflecting the data model above. This has the benefit of unifying the original source wording of the contract with data abstraction, obviating the need to synchronize two objects. An additional benefit is that XML, JSON, and other tree-based representations of Contract Documents provides a consistent format for persistence of words and data that supports both human and machine consumption and analysis.

An example XML representation of the contact model is:

```
<Contract>
    <Transaction type="CreateContract">
        <ContractDocumentSource name="Services Agreement.pdf" docid="AA1234567890">
        <Clause legal="Heading">
          Supply Agreement
        </Clause>
        <Clause legal="Obligation" business="Delivery" direction="On Supplier" timing="On Execution" Contingency="None">
          On Execution of this agreement, Supplier shall deliver the Product to Customer.
        </Clause>
        <!-- repeat the <clause> structure here for every clause of the contract,
            with other elements as necessary for tabular structures, images, and the like -->
    </Transaction>
</Contract>
```

In another version of the data model, words, objects, and data abstractions are represented in a graph database, where each phrase is linked one-to-many times with applicable data attributes, and linked to applicable transaction and contract objects, and to legal entity objects, and to clause objects, where the clause is itself a compilation of several phrases. This could for example be implemented in a triple store using RDF, the Resource Description Framework, a W3C data standard. This approach supports highly accurate queries across large volumes of data with fine grained visibility, without the need for up-front modeling of relational database tables.

Table 5 (below) is an example of an implementation of a triple/quad store representation of the contract model.

TABLE 5

| Subject | Predicate | Object | NamedGraph |
|---|---|---|---|
| Txn001 | hasTargetObject | Con001 | Con001 |
| Txn001 | hasTransactionType | Create | Con001 |
| Txn001 | hasDocumentSource | Doc001 | Con001 |
| Txn001 | hasTransactionStatus | Active | Con001 |
| Txn001 | hasContractType | Sell-Side | Con001 |
| Txn001 | hasParty | LE001 | Con001 |
| LE001 | hasTransactionRole | Vendor | Con001 |
| LE002 | isPartyTo | Txn001 | Con001 |
| LE002 | hasTransactionRole | Customer | Con001 |
| Txn001 | hasDateEffective | Nov. 11, 2011 | Con001 |
| Txn001 | hasDateExpiry | Nov. 11, 2012 | Con001 |
| Txn001 | containsClause | Cls001 | Con001 |
| Cls001 | containsPerformanceObligationOn | LE001 | Con001 |
| Cls001 | hasRiskClassification | High | Con001 |
| Cls001 | hasObligationClassification | LicenseExclusive | Con001 |
| Cls001 | hasSubjectMatter | Software | Con001 |
| Cls001 | hasContent | P1 grants an exclusive software license to P2 | Con001 |
| Txn002 | hasTransactionType | Amend | Con001 |
| Txn002 | containsClause | Cls008 | Con001 |
| Cls008 | amendsClause | Cls001 | Con001 |
| Cls008 | hasObligationClassification | LicenseNonExclusive | Con001 |

In another version of the data model, an improved method of combining normalized data with custom extensions is utilized. An optional feature of this model is one that includes extensible business classifications and extensible conditionality classifiers, for example, using tags/hashtags. This enables the platform to be deployed using a normalized data model quickly, but with a low-effort customization layer that personalizes the data to specific customer scenarios and business needs.

In another version of the data model, a normalized contractual risk model is utilized. Due to the words-to-data problem and the idiosyncrasy problem, an objective measurement of contractual risk has never been possible. Without a normalized contract data model there is no reliable benchmark against which contractual risk scoring can be applied. Assessments of contract risk are thus left to human experts and are typically based on an assessment of a single contract. However, when one introduces a normalized contractual data model, it is possible to apply contractual risk scoring attributes to specific data outcomes, and thus automate overall risk scoring at the contract level and across a portfolio of contracts.

Universal Contract Model Roll-Up

Referring back to FIG. 1, Universal Contract Model Roll-Up describes the procedures for roll-up of contract terms to determine the prevailing terms of the contract at the present time or at another predetermined point in time. In order to roll up the contract terms the historical terms of related contract documents and events are evaluated and rolled-up to the Contract Object 100 so that a trusted summary of the current terms can be viewed in one place. This is accomplished by using the Contract Object 100 to present a roll-up of all terms implemented in its child transactions. The Contract Object 100 evaluates all active child Transaction Objects 102 chronologically to build the single set of terms. The Contract Object 100 does not evaluate draft Transaction Objects 102 or terminated/rescinded Transaction Objects 102. The Contract Object 100 sums or accumulates certain order values, namely contract value and performance obligations, and in the case of orders, includes expired/terminated orders (but not rescinded orders). Every time there is a state change at the transaction level under a Contract Object 100, the Contract Object 100 should trigger a re-evaluation of its current terms.

Figure 5:
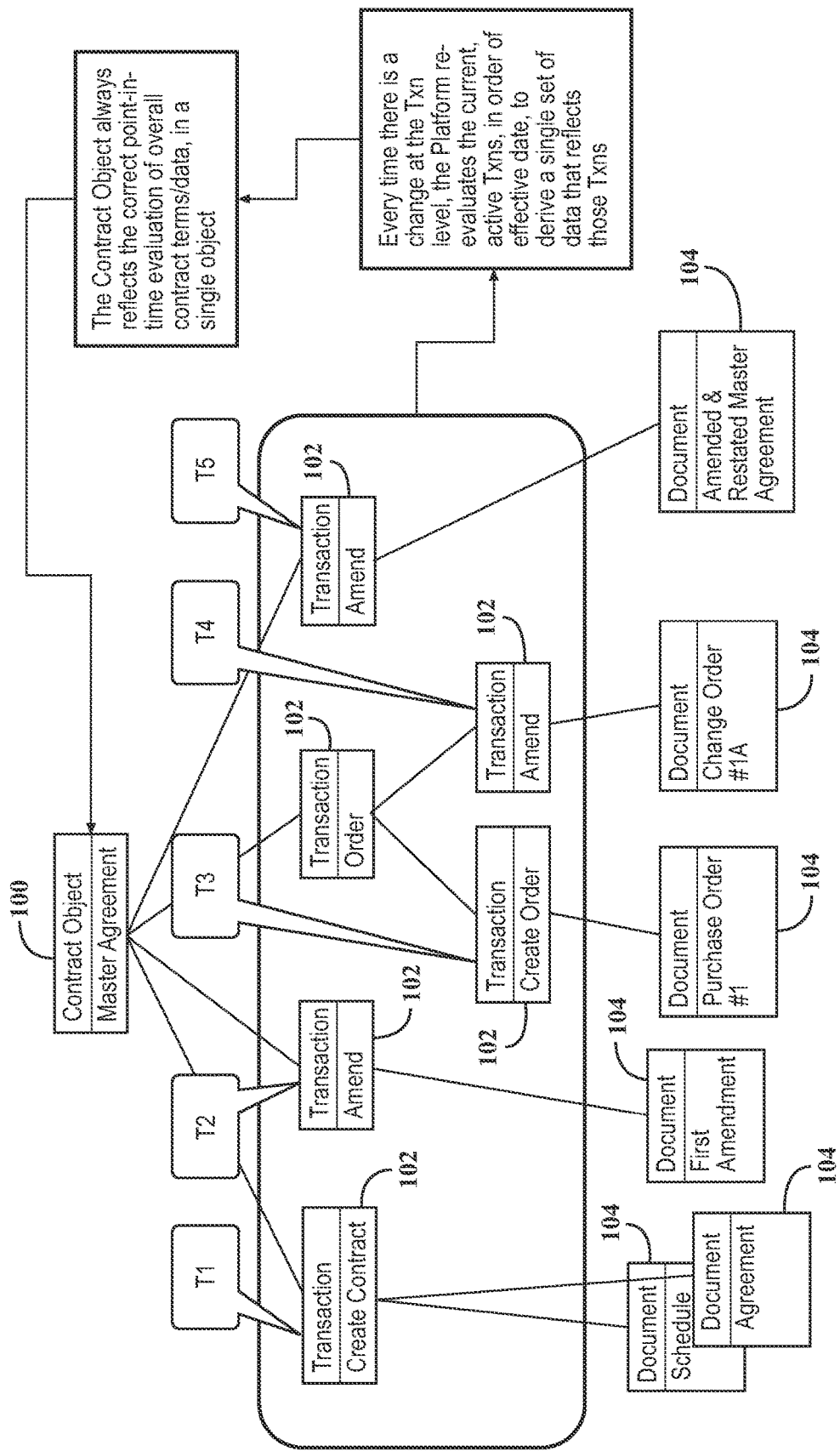
FIG. 5 is a diagram describing data roll up to a contract object according to an embodiment.

Referring now to FIG. 5, a Contract Object 100 is re-evaluated each time a Transaction Object 102, such as a create transaction, amend transaction, or order transaction is added or changed. Transactions may be added or changed based upon re-evaluation of a Contract Document Object 104 or the addition of new Contract Document Objects 104, such as by addition of a new schedule, amendment, purchase order, change order, novation, or termination, etc. Every time there is a change at the transaction level, the platform re-evaluates the current active transactions to re-evaluate data for the Contract Object 100 from the currently active transactions to derive a single set of data that reflects those transactions for the point in time desired for the contract. For example, the Contract Object might be rolled up based upon the active transactions for the present point in time or the Contract Object 100 might be rolled up using the active transactions for previous or future point in time by only incorporating the transactions active at said given point in time.

Figure 6:
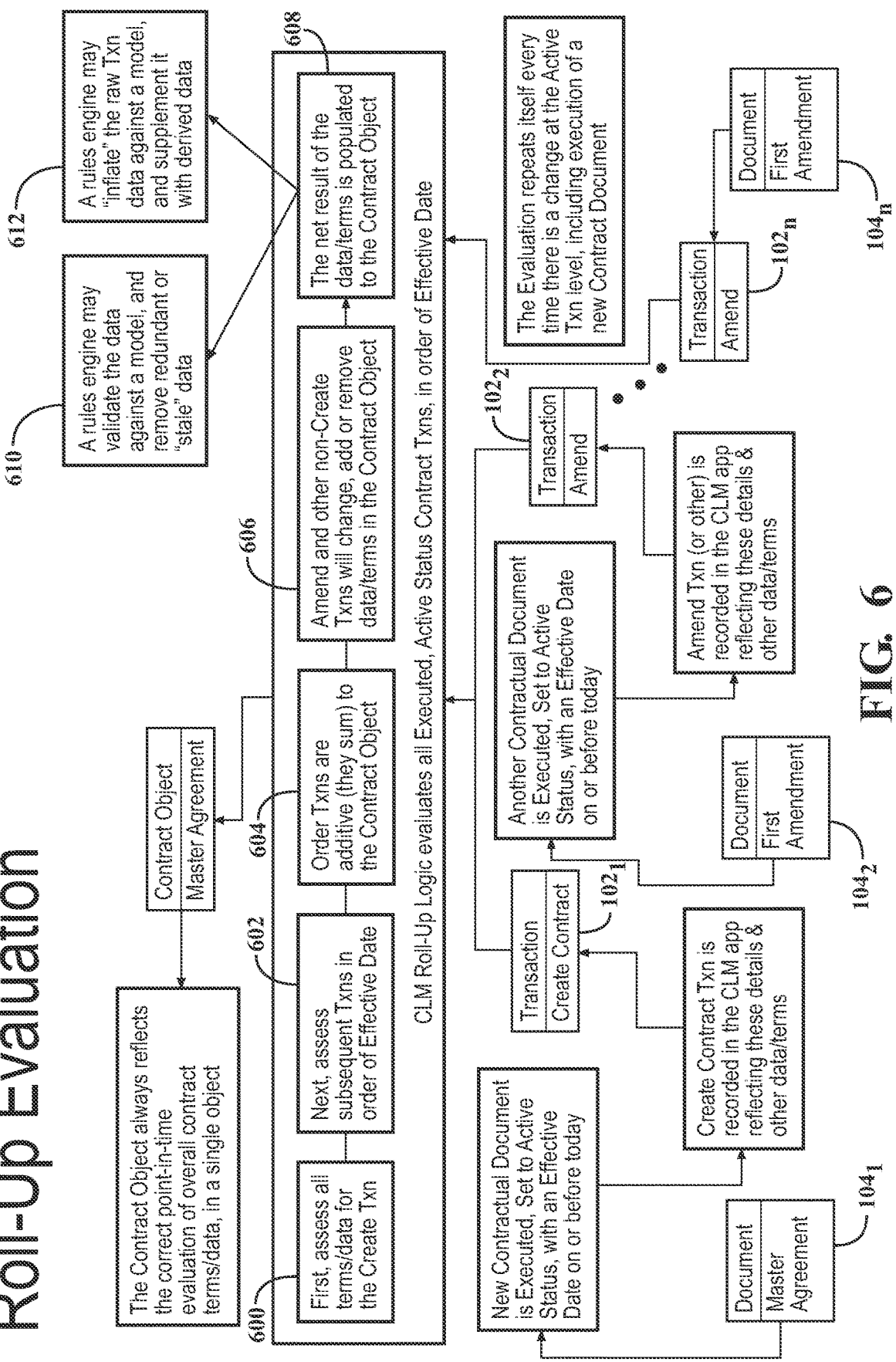
FIG. 6 is another diagram describing data roll up to a contract object according to an embodiment.

As shown in FIG. 6, for a sample Contract Object 100, a Document Object $104_1$ that is an executed master agreement is created, set to active and given an effective date. Next, a Create Contract Transaction Object $102_1$ is created reflecting the terms and details of the master agreement. Later, a Document Object $104_2$ that is a first amendment is executed, set to active and given an effective date. An amend contract Transaction Object $102_2$ is then created reflecting the terms and details of the amendment. For each subsequent contract Document Object $104_n$ added one or more Transaction Objects $102_n$ are added.

Every time a Transaction Object $102_n$ or a Document Object $104_n$ is added, data from all Transaction Objects 102 is rolled up to the Contract Object 100.

The roll up is performed, in a step 600, by assessing all terms and data for the Create Contract transaction and incorporating the data into the Contract Object 100. Next, in a step 602, all subsequent transactions are assessed in order of effective date. If the transaction is currently active, the data from the order transactions is used to add to the data of the Contract Object 100 (step 604) or, for other transaction types, used add, remove, or modify the data of the Contract Object (step 606). In a step 608, after all transaction have been processed, the net result of data from evaluating the transactions is populated to the Contract Object 100. Finally, in steps 610 and 612, a rules engine can validate the data against a model and remove redundant or stale data and inflate raw data in the Contract Object 100 against a model and supplement it with derived data. For example, a UCM Data Model may specify that certain data attributes are only included based upon other data attributes (nested or dependent data). A Contract with a Term attribute set to "12 months" may include a derived Expiry Date set to "Dec. 31, 2018" (via an "Inflate" calculation). But if that Term attribute is changed to "ongoing" the Expiry Date attribute becomes "stale" and should be purged from the UCM data set.

Several steps are undertaken to recognize and conform contractual terms to a data model. The first step is to import existing contract documents into the present platform and to turn the words on each page of those documents into actionable data, allowing a party to instantly report on, visualize, and analyze individual contracts and the trends across an entire contract portfolio. This helps keep a party ahead of its obligations and to avoid breaches and compliance failures.

In one approach, the platform presents users with a dynamic questionnaire or wizard to capture and create a data abstraction of the imported documents and Contract Txns. This wizard approach (or machine-augmented approach) ensures that users are guided through essential data features of the contracts and helps to improve the consistency and quality of human capture.

In another approach, the capture and creation of the data abstraction is performed by machines using a supervised learning technique. The machine (typically a software algorithm) is trained with examples of contract documents, contract clauses, contract sentences and/or contract phrases (the "contract corpus"), from which a set of rules is developed and refined using one or more heuristic or machine learning methods. Those methods may include one or more statistical natural language processing algorithms, neural network "deep learning" algorithms, and other machine learning algorithms. The quality of a contract corpus for machine learning training purposes is enhanced by the size and diversity of examples in the corpus. To build a large corpus, it is first seeded with examples sourced from public, open repositories such as those made available by government agencies. Non-public samples may also be sourced by agreement with private contracting parties, but these must be maintained and curated using strict privacy methods, ensuring that no human is able to discover private contract data via direct or indirect interaction with the corpus. In order to address the privacy need of the private-sourced corpus, two methods may be used. First, individual clauses/sentences are human processed independently of their document context, ensuring the full meaning of those sentences/clauses is not disclosed. Second, each sentence clause is pre-processed via an anonymization gateway to obfuscate identifying information. In one method of anonymization, party name/alias information is substituted with a randomized pool of party names/aliases before presentation to a human reviewer.

In a hybrid approach, the system rules are optimized based on both human and machine capture, with human corrections to machine extraction feeding back into the machine learning algorithm and/or contract corpus. An important benefit of the machine learning approach is that it is not constrained by the learning limitations of human memory. Unlike a human expert, the machine learning software can process a contract corpus many orders of magnitude larger than a human can read and retain. When combined with a universal contract model, this supports machine learning and capture outcomes that exceed the accuracy of a human expert.

Figure 7:
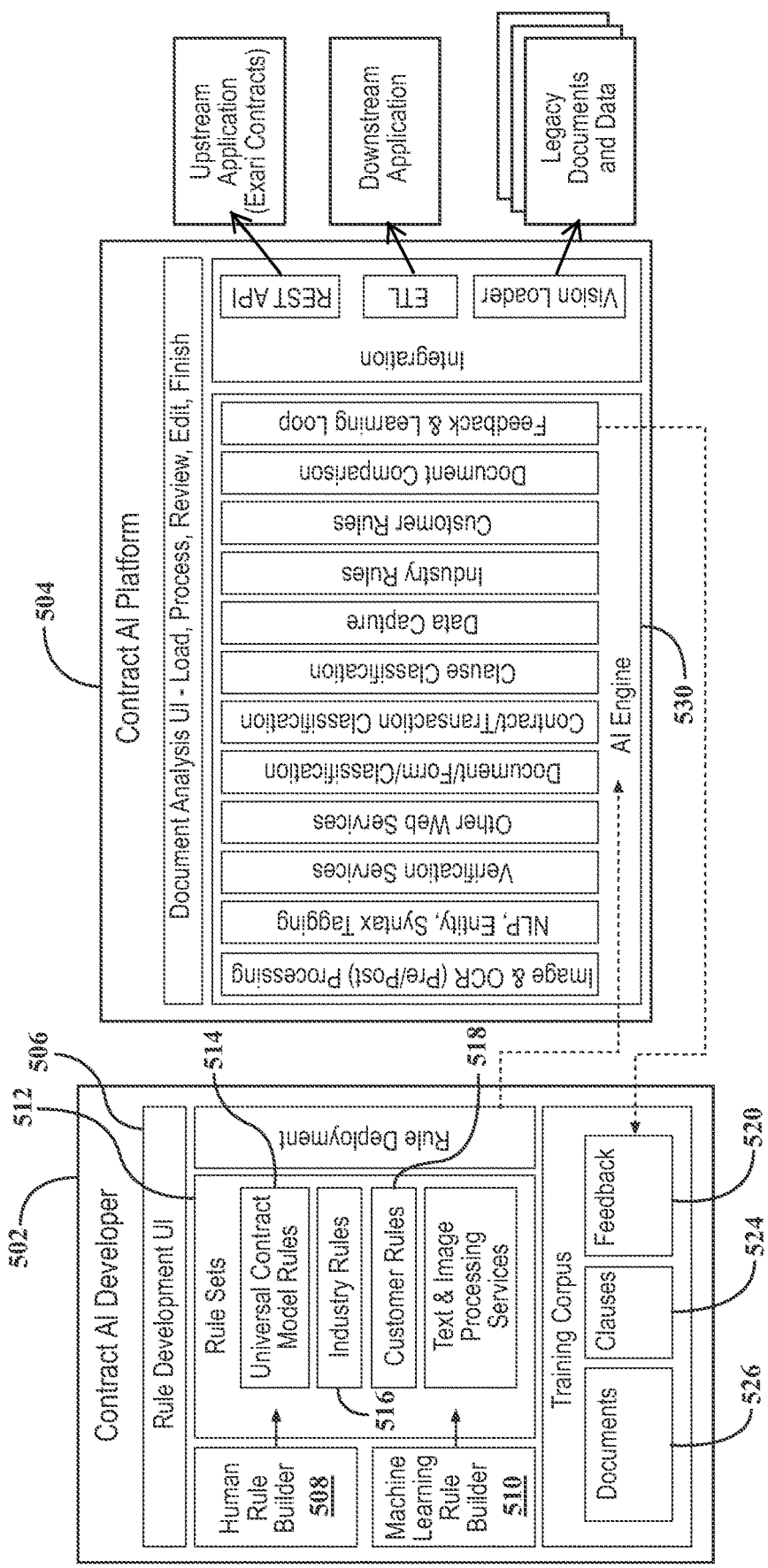
FIG. 7 is a contract AI developer application and contract AI production platform according to an embodiment.

To that end and according to an embodiment of the present invention, a platform uses artificial intelligence to capture contracts and apply captured data to the universal contract model data object and data model. Referring to FIG. 7, legacy contracts, third party contracts and existing contractual metadata (if any) are analyzed by scanning a paper document and performing optical character recognition to convert a scanned image to computer readable text. Optionally, the computer readable text is manually reviewed and corrected by a human to create OCR corrected data. From the computer readable text, a machine learning/artificial intelligence ("ML/AI") module is used to obtain data from the contract text for application to the universal contract model.

This task is performed by utilizing a contract AI developer module 502 and a contract AI platform 504. The contract AI developer module 502 comprises a rule development user interface 506 allowing a user to create rules for contract AI rule development using a human rule builder module 508. The contract AI developer module 502 further comprises a ML/AI rule builder module 510. The rule builder modules 508 and 510 process documents and clauses from contracts to create rule sets that are categorized as universal contract module rule sets 514, industry specific rule sets 516, and customer specific rule sets 518, as described below. The rules are deployed to the contract AI platform 504 (described below). The contract AI platform 504 further provides a feedback training corpus 520 that further includes a contract document training corpus 526 and a contract clause training corpus 524.

Figure 8:
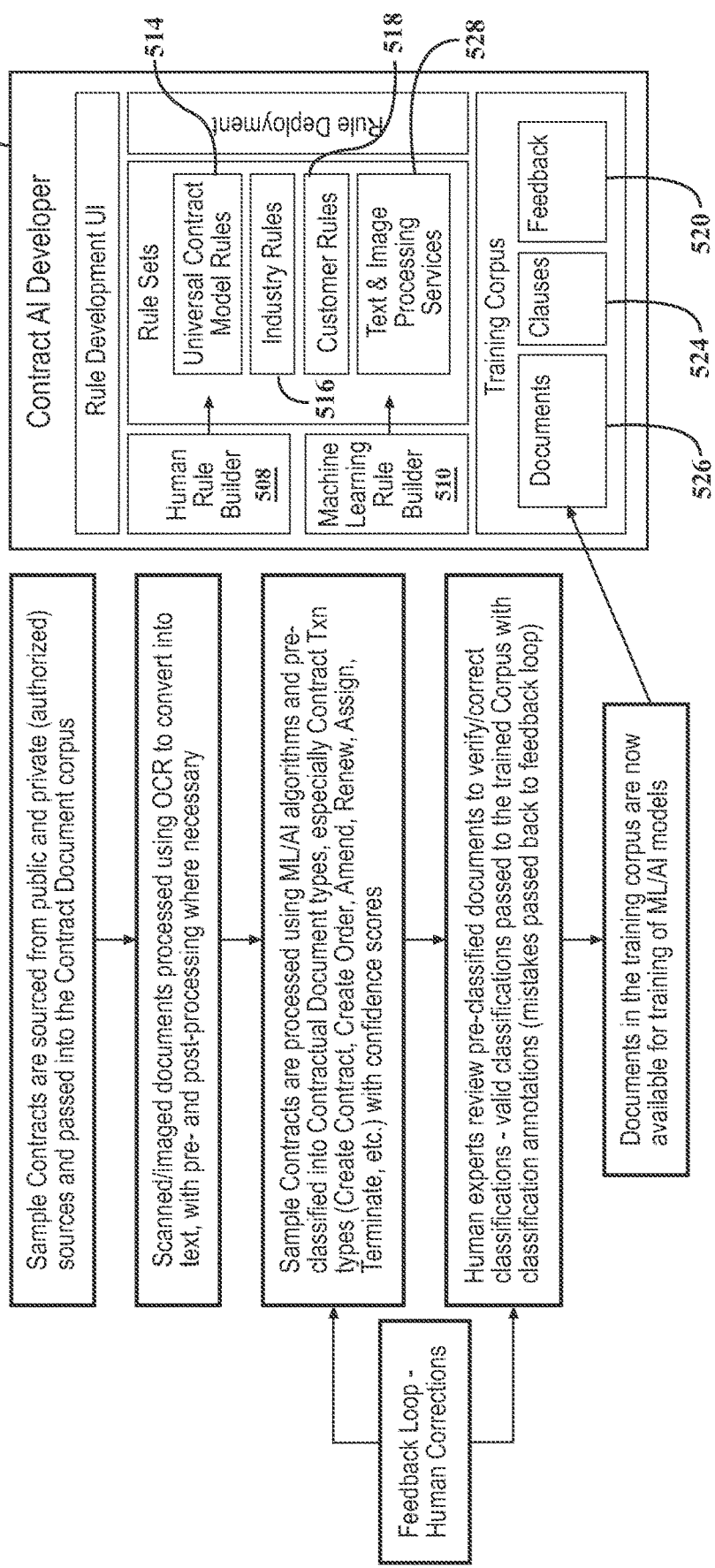
FIG. 8 details a step for using machine learning/artificial intelligence to recognize and conform contractual terms to a data model according to an embodiment.

Referring to FIG. 8, contract documents from public and private sources are processed using optical character recognition ("OCR") with a text and imaging processing module 528. The contract documents are then processed using ML/AI and pre-classified into contract document types according to the universal contract model. Confidence scores from the ML/AI process are provided with each object type.

Next, human experts review the pre-classified contract documents to determine whether the ML/AI process correctly classified the contract documents. Correctly classified documents are passed to the document training corpus 526. Incorrect classifications are correctly identified by human experts and the classification information passed back to the ML/AI algorithms to correctly classify future contract documents.

Figure 9:
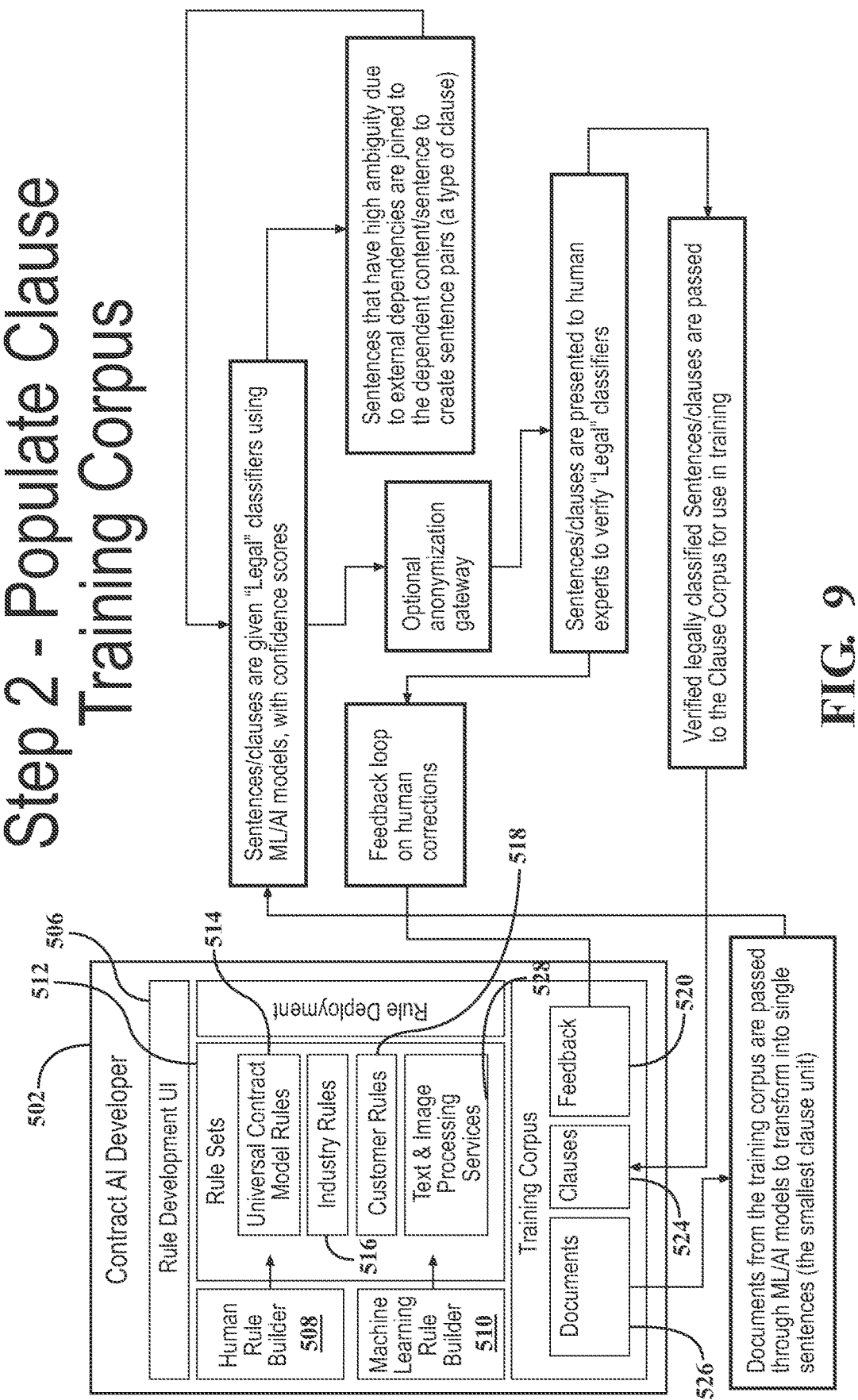
FIG. 9 details a step for using machine learning/artificial intelligence to recognize and conform contractual terms to a data model according to an embodiment.

Referring to FIG. 9, the clause training corpus 524 is populated from the document training corpus 526 through the ML/AI process to transform the documents into a collection of single sentences. The sentences are then given legal classifiers using the ML/AI models with corresponding confidence scores. Sentences that have high ambiguity are joined with dependent content or a dependent sentence to create sentence pairs and re-analyzed for legal classification as a sentence pair. Sentences with lower ambiguity are optionally anonymized and presented to human classifiers to verify the legal classification. When human corrections are made, the corrections are provided to the feedback training corpus 520 and the clauses are provided to the clause training corpus 524.

Figure 10:
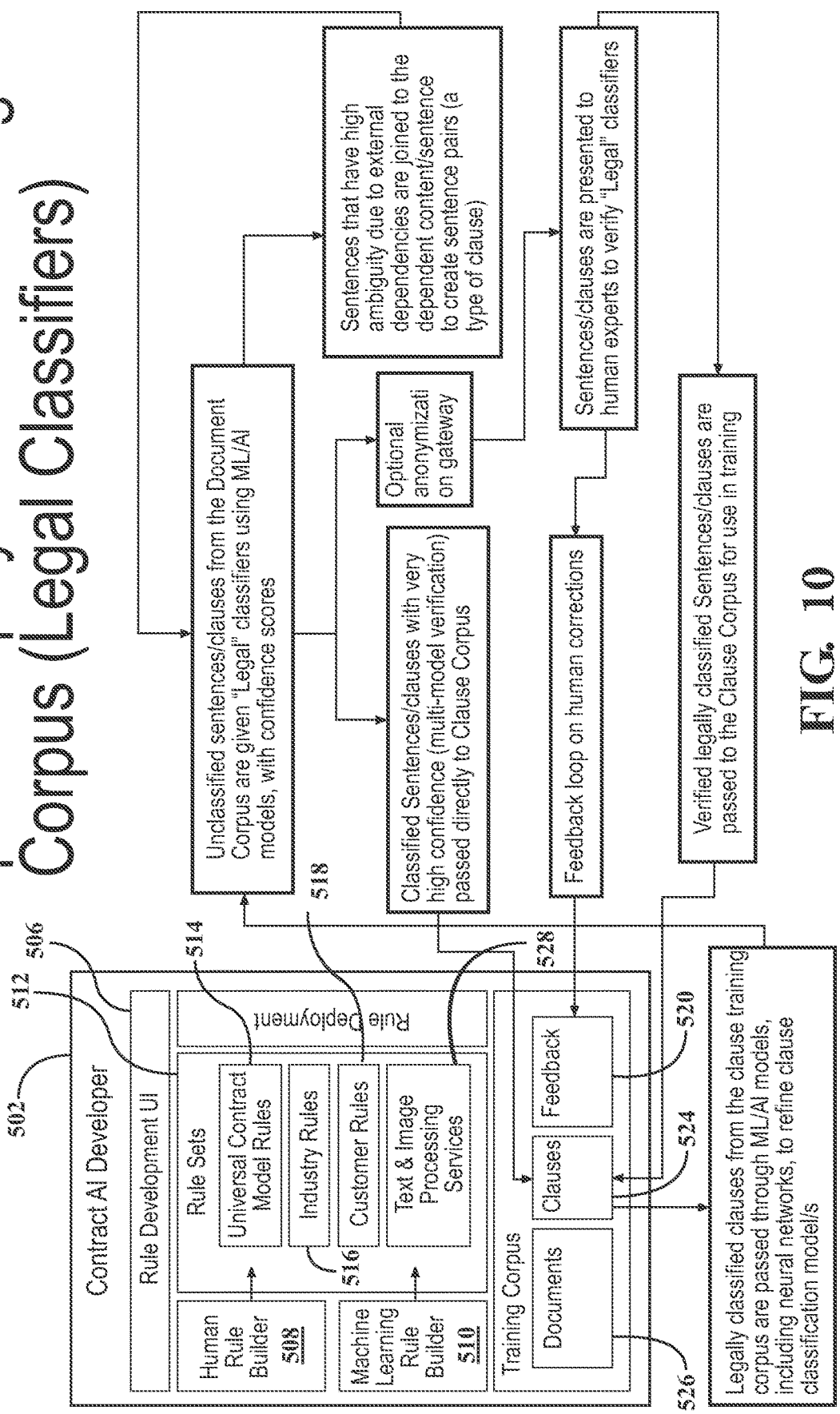
FIG. 10 details a step for using machine learning/artificial intelligence to recognize and conform contractual terms to a data model according to an embodiment.

Referring to FIG. 10, in a third step, the clause training corpus 524 is amplified by legally re-classifying clauses from the clause training corpus 524 by passing them through ML/AI models to refine the clause classification. Clauses or sentences that remain unclassified from the document training corpus 526 are also classified with legal classifiers using ML/AI models and given confidence scores. Sentences that have high ambiguity due to external dependencies are joined to the dependent content/sentence to create sentence pairs (a type of clause) and resent the ML/AI to be classified with legal classifiers and given confidence scores. From the classification step, classified sentences/clauses with high confidence scores are passed directly to clause training corpus 524. Clauses with lower confidence scores are passed to an optional anonymizer and then presented to human experts to verify the classification. Classifications that are corrected are sent to the feedback training corpus 520 and clauses that are not corrected are sent to the clause training corpus 524.

Figure 11:
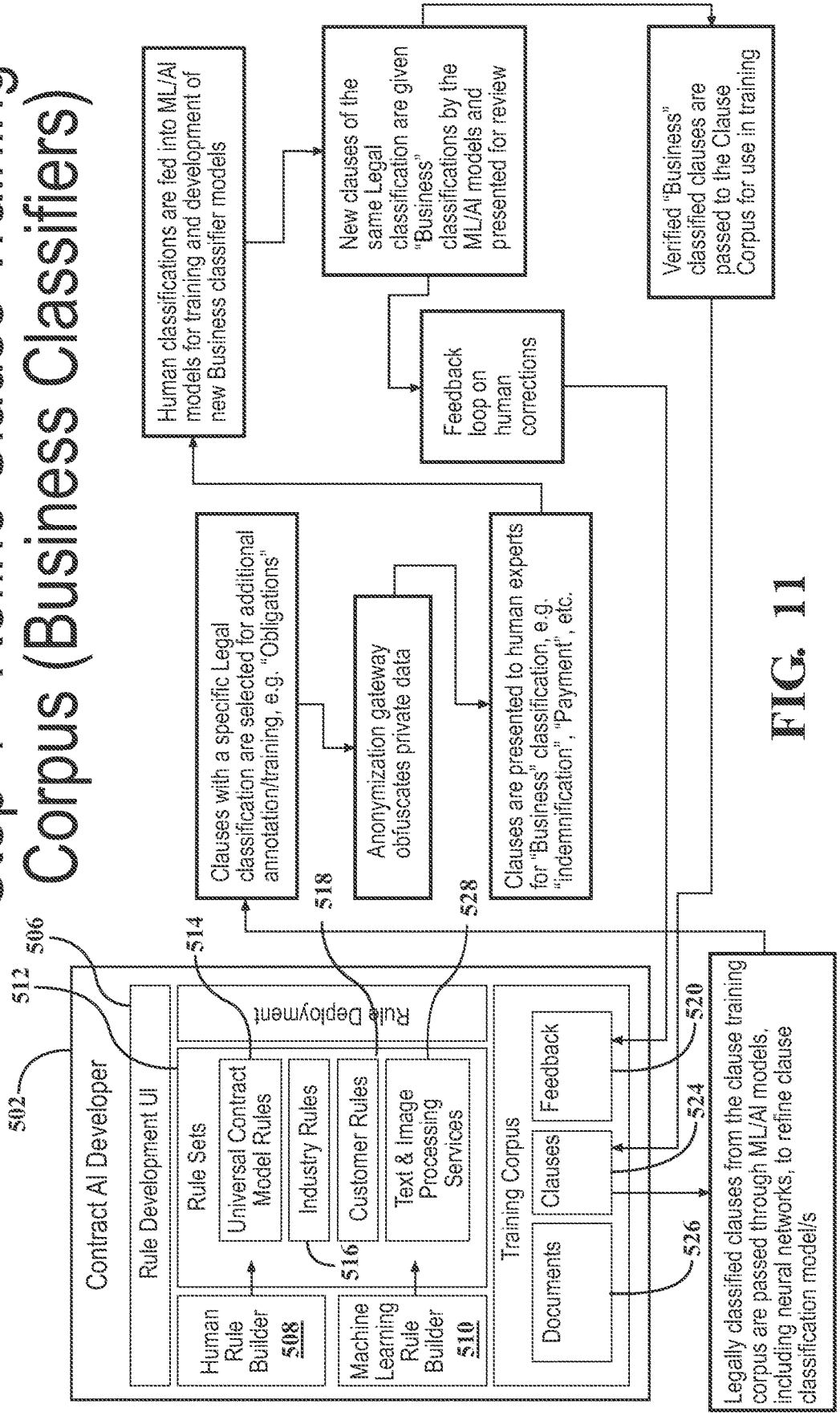
FIG. 11 details a step for using machine learning/artificial intelligence to recognize and conform contractual terms to a data model according to an embodiment.

Referring to FIG. 11, in a fourth step, the clause training corpus 524 is refined by first taking legally classified clauses from the clause training corpus 524 and passing them through ML/AI models to refine clause classification models. Clauses with a specific legal classification are selected for additional annotation/training, e.g., "obligations". The clauses then, optionally, are anonymized by obfuscating private data and presented to human experts for further sub-classification, e.g., "indemnification," "payment," etc. Next human classifications are fed into ML/AI models for training and development of new business classifier models. New clauses of the same legal classification are given "business" or "subject" classifications by the ML/AI models and presented for human review. Verified "business" classified clauses are passed to the clause training corpus 524 for use in training. Corrected "business" classified clauses are passed to the feedback training corpus 520 for use in training.

Figure 12:
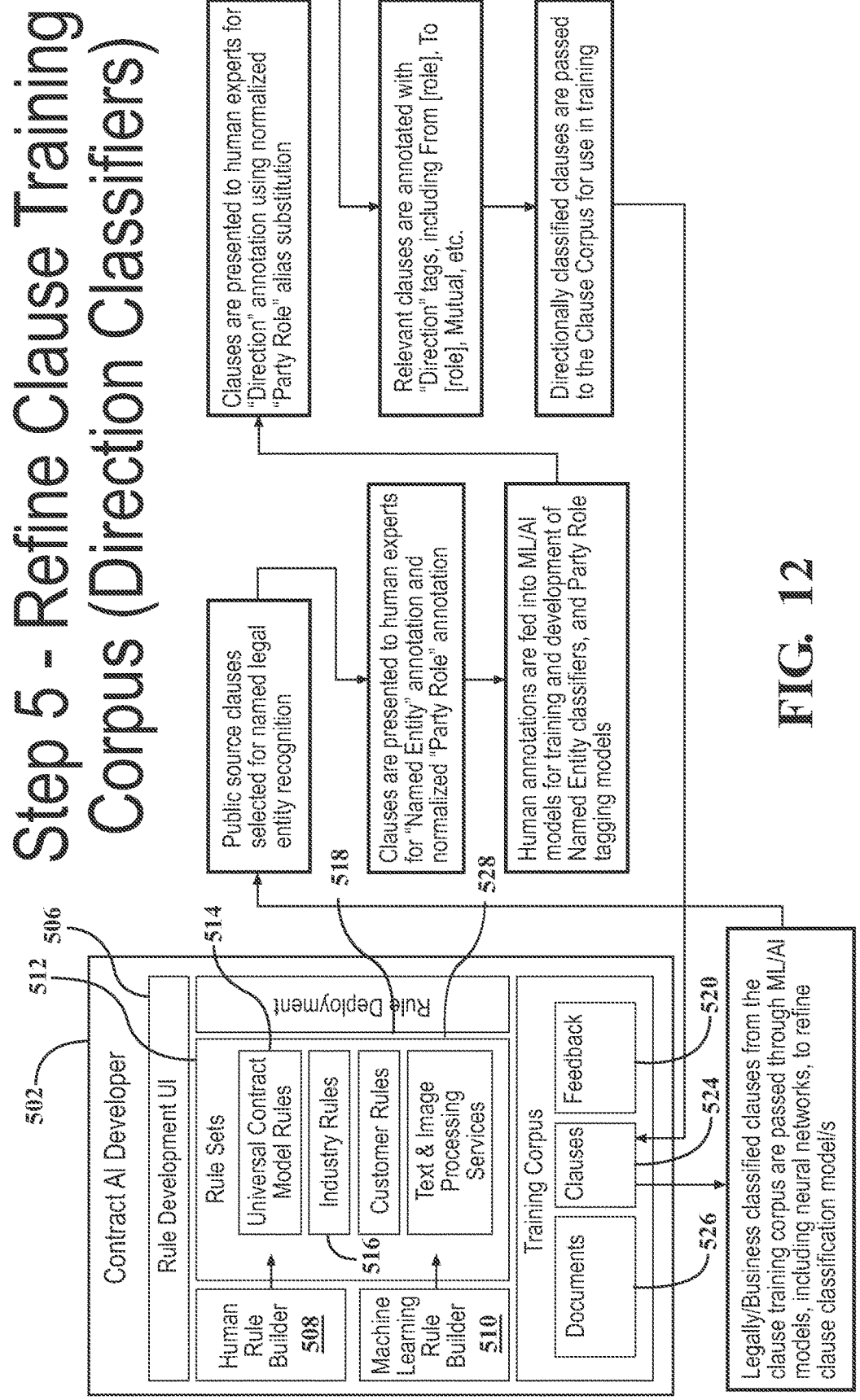
FIG. 12 details a step for using machine learning/artificial intelligence to recognize and conform contractual terms to a data model according to an embodiment.

Referring to FIG. 12, in a fifth step, the clause training corpus 524 is further refined with direction classifiers by, first, taking legally and business classified clauses from the clause training corpus 524 and passing them through ML/AI models to refine clause classification models. Public source clauses are then selected for named legal entity recognition. Clauses are presented to human experts for "named entity" annotation and normalized "party role" annotation. Human expert annotations are fed into ML/AI models for training and development of named entity classifiers and party role tagging models. Clauses are then presented to human experts for "direction" annotation using normalized "party role" alias substitution. Relevant clauses are annotated with "direction" tags, including From [role], To [role], Mutual, etc. For example, an Obligation may be classified as "Mutual" or "From Supplier", and a Right to Renew may be classified as "To Customer". Directionally classified clauses are then passed to the clause training corpus 524 for use in training.

Figure 13:
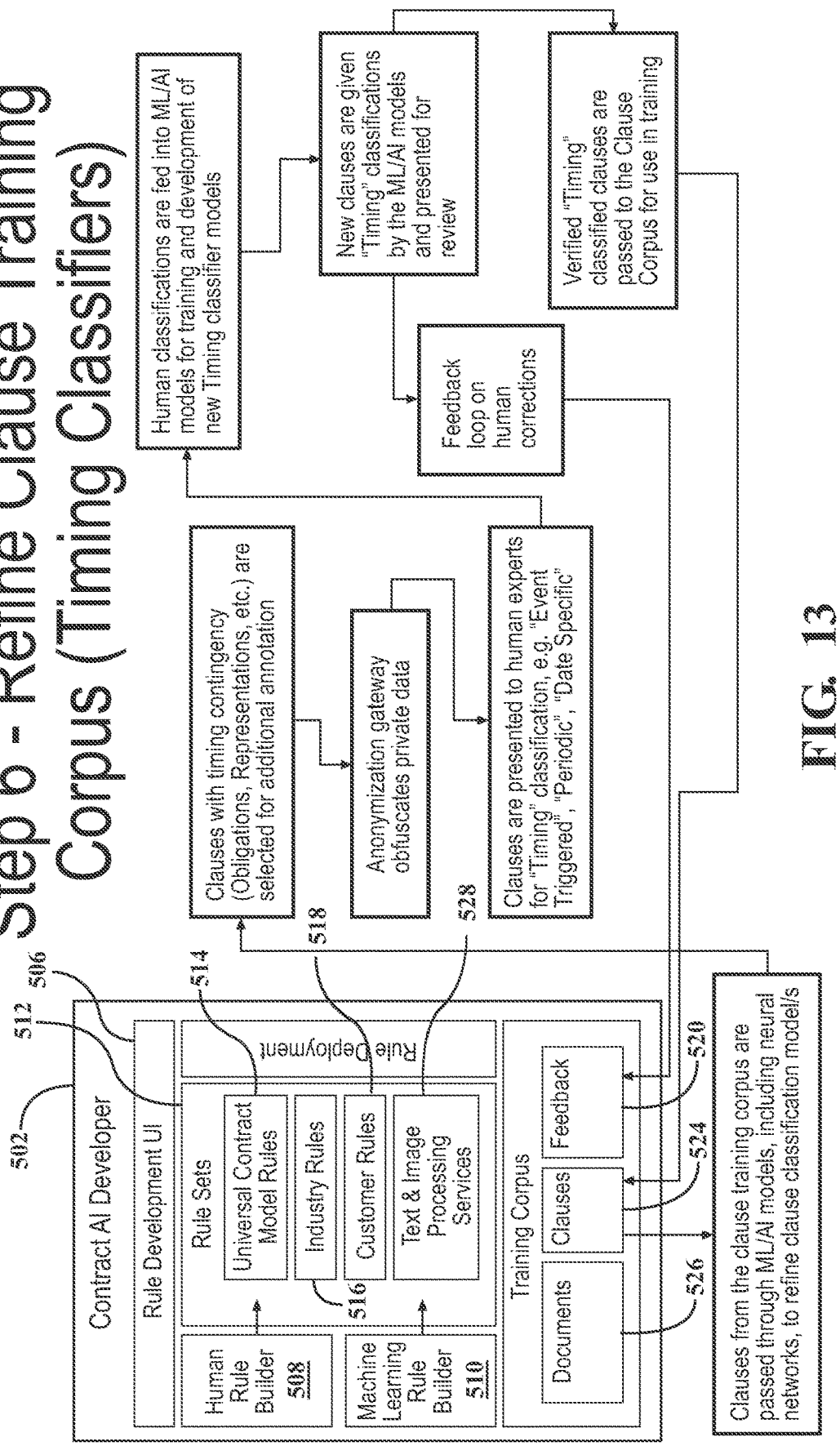
FIG. 13 details a step for using machine learning/artificial intelligence to recognize and conform contractual terms to a data model according to an embodiment.

Referring to FIG. 13, in a sixth step, the clause training corpus 524 is further refined with timing classifiers by, first, taking clauses from the clause training corpus 524 and passing them through ML/AI models to refine clause classification models. Next, clauses with timing contingencies (Obligations, Representations, etc.) are selected for additional annotation. The clauses then, optionally, are anonymized by obfuscating private data and presented to human experts for further "timing" classification, e.g., "event triggered", "periodic", "date specific", etc. Human classifications are fed into ML/AI models for training and development of new timing classifier models. New clauses are given "timing" classifications by the ML/AI models and presented for human review. Verified "timing" classified clauses are passed to the clause training corpus for use in training. Corrected "timing" classified clauses are passed to the feedback training corpus 520 for use in training.

Figure 14:
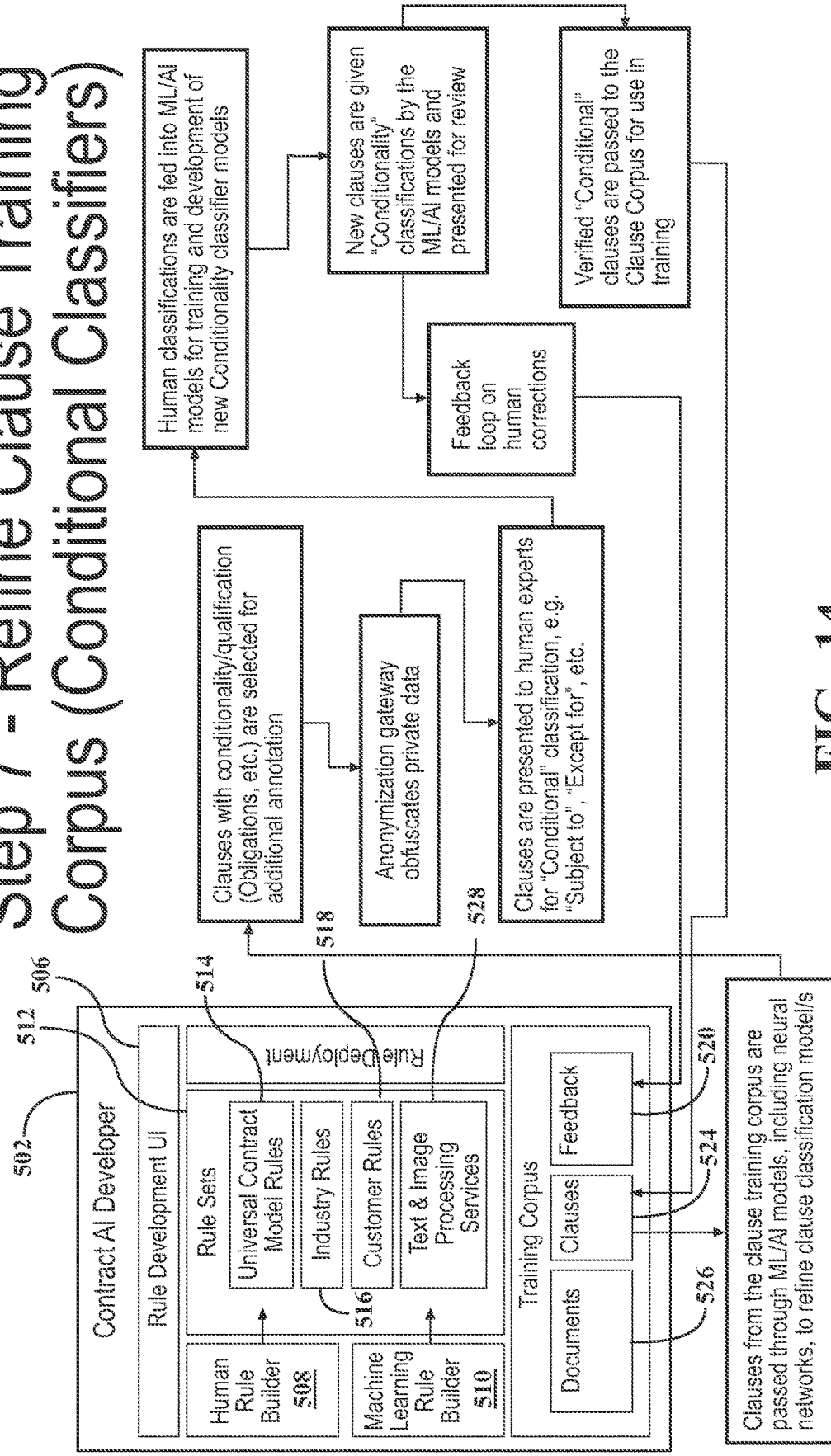
FIG. 14 details a step for using machine learning/artificial intelligence to recognize and conform contractual terms to a data model according to an embodiment.

Referring to FIG. 14, in a seventh step, the clause training corpus 524 is further refined with conditional classifiers by, first, taking clauses from the clause training corpus 524 and passing them through ML/AI models to refine clause classification models. Next, clauses with conditionality/qualification (Obligations, etc.) ("conditionality" clauses) are selected for additional annotation. The clauses then, optionally, are anonymized by obfuscating private data and presented to human experts for further "conditionality" classification, e.g., "Subject to", "Except for", etc. Human classifications are fed into ML/AI models for training and development of new conditionality classifier models. New clauses are given "conditionality" classifications by the ML/AI models and presented for human review. Verified "conditional" clauses are passed to the clause training corpus 524 for use in training. Corrected "conditionality" classified clauses are passed to the feedback training corpus 520 for use in training.

Figure 15:
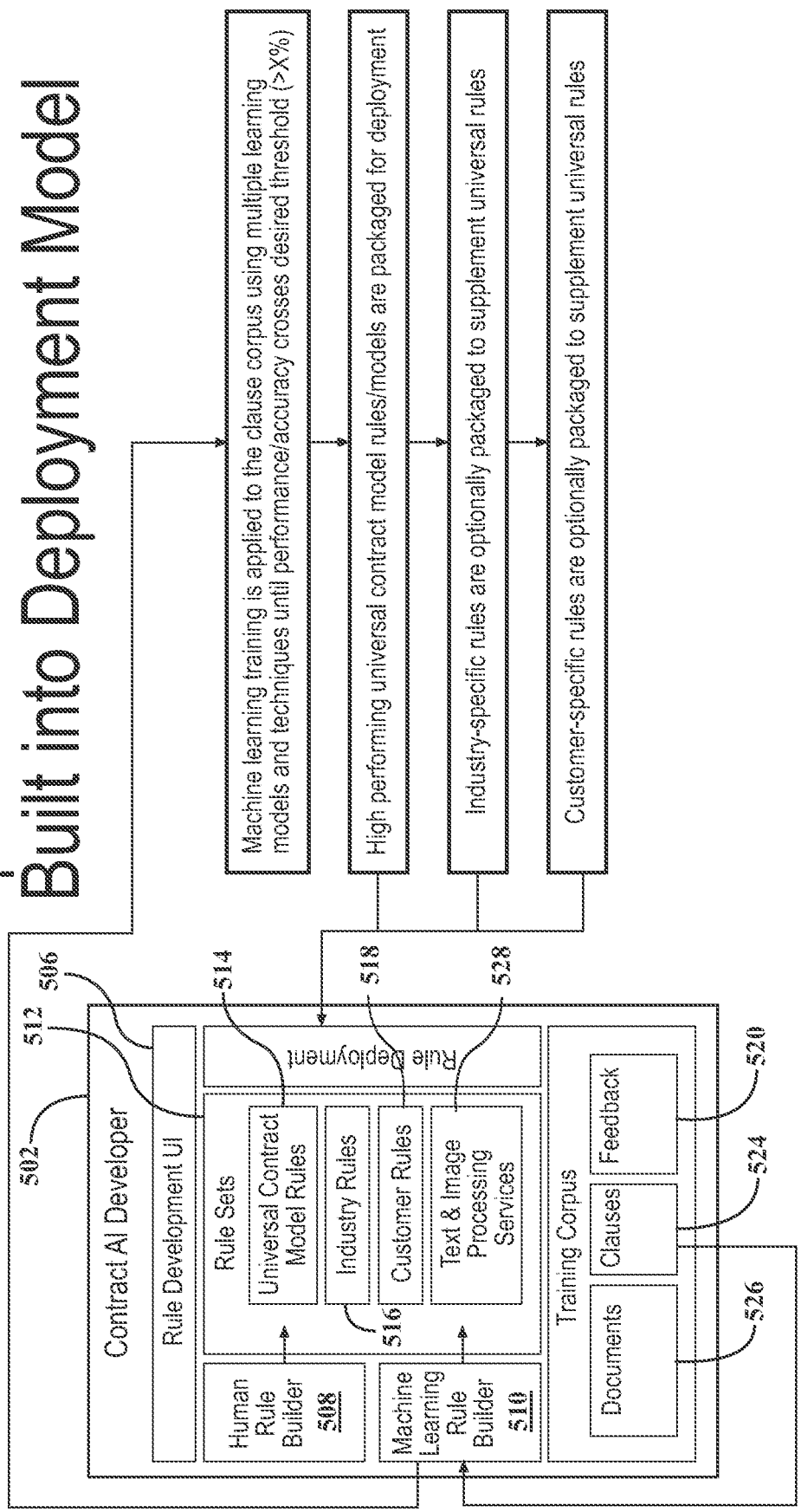
FIG. 15 details a step for using machine learning/artificial intelligence to recognize and conform contractual terms to a data model according to an embodiment.

Referring to FIG. 15, in an eighth step, ML/AI training is applied to the clause training corpus 524 using multiple learning models and techniques until performance/accuracy crosses a desired threshold (>X %). Next, once the threshold is met, high performing universal contract model rules sets 514 are packaged for deployment in a rule deployment package. Industry-specific rule sets 516 are optionally packaged to supplement universal rules, and customer-specific rule sets 518 are optionally packaged to supplement universal rules.

Figure 16:
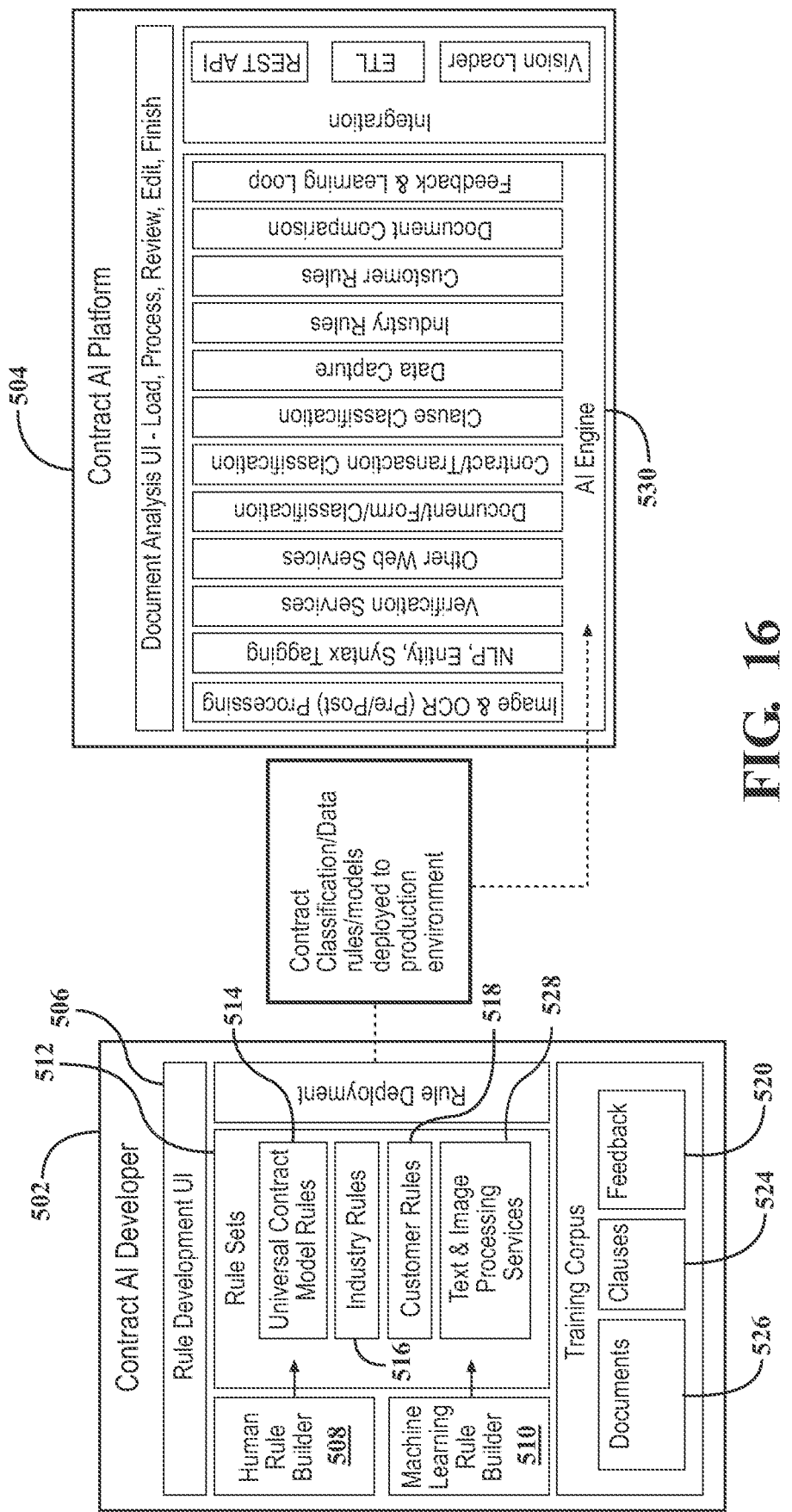
FIG. 16 details a step for using machine learning/artificial intelligence to recognize and conform contractual terms to a data model according to an embodiment.

Referring to FIG. 16, in a ninth step, universal contract module rule sets 514, industry specific rule sets 516 and customer rule sets 518 are deployed form the contract AI developer module 502 to an AI engine 530 associated with the contract AI platform 504.

Figure 17:
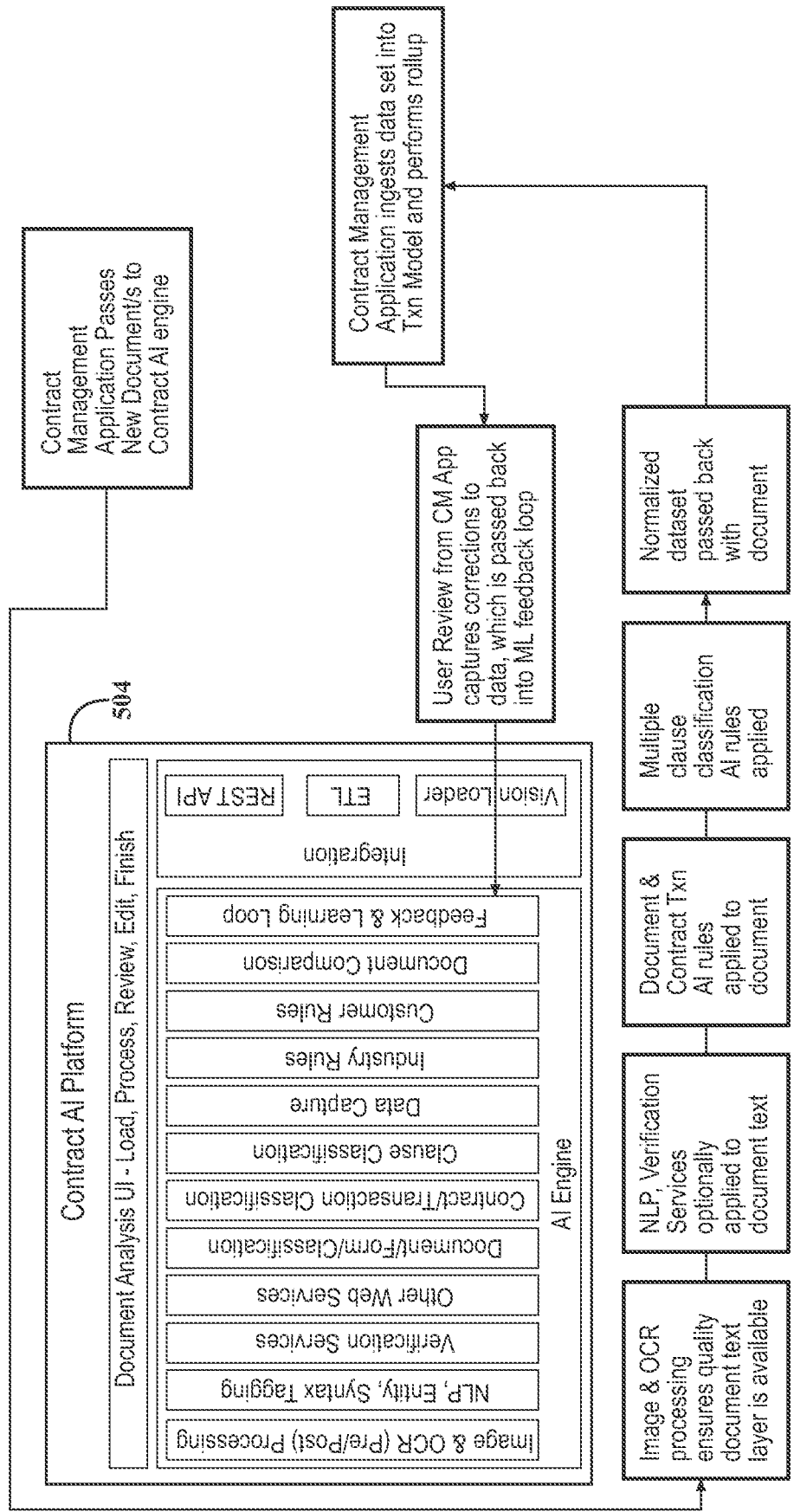
FIG. 17 details a step for using machine learning/artificial intelligence to recognize and conform contractual terms to a data model according to an embodiment.

Finally, referring to FIG. 17, in a tenth step, a contract management application passes new contract documents to the contract AI platform 504. The contract AI platform 504 images and OCR processes the contract document to ensure that a high-quality document text layer is available. Natural Language Processing (NLP) and Verification Services are optionally applied to document text, for example, to provide supplementary annotation of the text like named entity recognition, sentence boundary detection, parts of speech tagging, or address verification. Next, document and contract transaction ML/AI rules are applied to the contract document. Next, multiple clause classification ML/AI rules are applied to the contract document. In a subsequent step, a normalized dataset according to the universal contract model is passed with the contract document and the contract management application ingests the dataset into the UCM transaction/object and data model and performs a contract model rollup. Finally, if the contract is reviewed by a user, the user's corrections from the contract management application captures corrections to data, which is passed back into ML/AI feedback loop of the contract AI platform 504.

Assessing Contractual Risk

The present platform develops an approach where contractual risk can be measured by assessing the extent to which a contract contains clauses that increase risk transfer to one party or create barriers to risk transfer to another party and supports both weighted, customer-specific adjustments to the risk score components, while also maintaining a universal, standard weighting. This supports the development of risk sub scores and overall contract risk scores that are tailored to the needs of specific enterprises.

A party can gain visibility into its contractual risk by scoring risk using an algorithm that analyzes risk factors to objectively measure the risk of each of a party's contracts, allowing the party to identify and manage issues before they can become problems. The present platform may include an implementation of a contractual risk model which measures the extent to which risk transfer is achieved or constrained (from a party-specific perspective) by the terms of any contract. In one implementation, one or more contractual terms/data points are declared to serve risk allocation purposes, and a maximum potential risk score is assigned to each such term, where a high score indicates an undesirable risk outcome (a likely risk increase) for the party whose contract portfolio is being assessed. One or more instance scores may then be declared for one or more specific values assigned to the contractual terms/data points, within the range between zero and the maximum. A normalized total contract risk score may now be evaluated for any one contract, for example, using an algorithm that scores contract risk as a percentage based on the instance score compared to the highest possible risk score. An optional approach supports a bifurcation of the universal risk score (based on the views of a pool of experts) and a customer specific version of the risk score, under which the customer applies a secondary weighting to elements of the universal risk score based on the views of its own risk experts. Another implementation of the risk scoring algorithm uses machine learning against a corpus of contractual documents and real-world risk outcome data to assign risk benchmark scores to the universal risk scoring model. For example, litigation outcome data (including judicial and settlement outcomes) could be used to assess the scoring of particular contract terms in achieving their intended risk allocation outcome.

Figure 18:
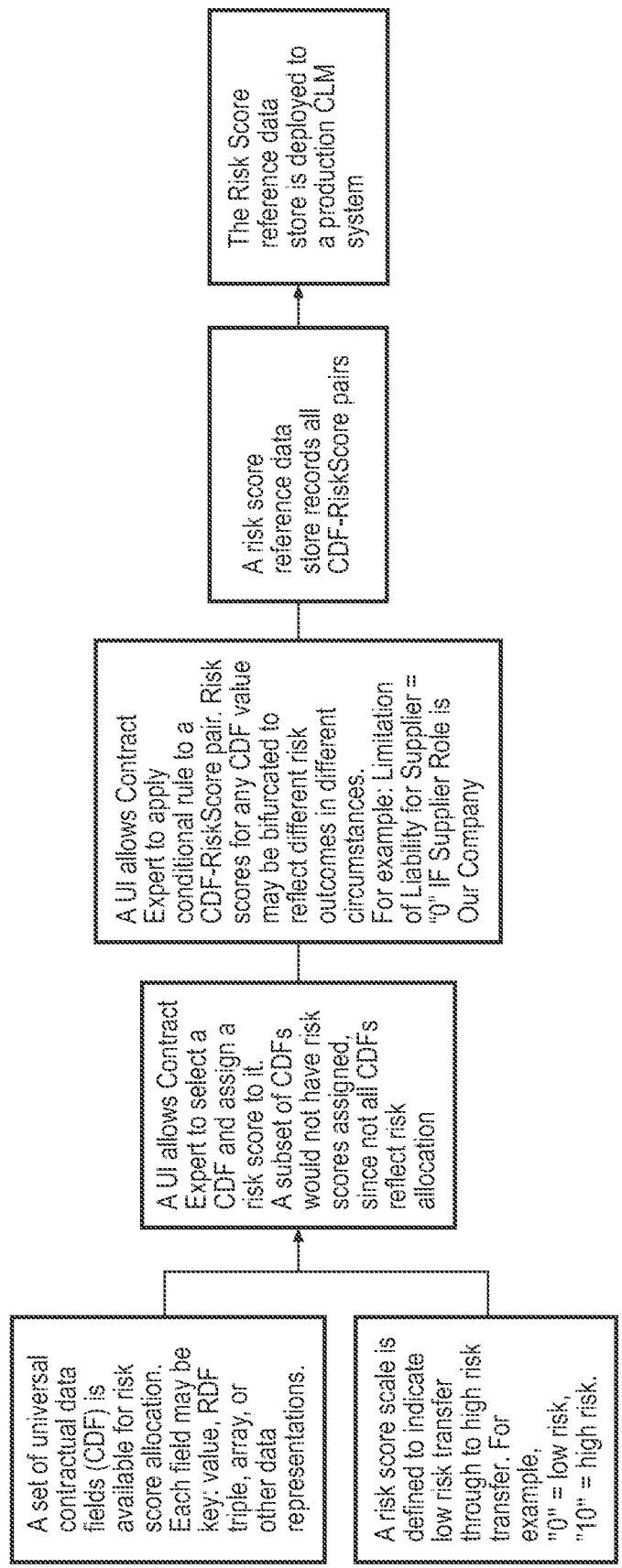
FIG. 18 details steps for assigning a contractual risk score to a contract according to an embodiment.

In that regard, and referring to FIG. 18, a contractual risk score is calculated by implementing a set of universal contractual data fields (CDF) that is available for risk score allocation. Each field may be key: value, RDF triple, array, or other data representations. Also, a risk score scale is defined to indicate low risk transfer through to high-risk transfer. For example, a low risk is associated with zero, and high risk is associated with a number, such as ten or more, with intermediate degrees of risk associated with numbers between zero and ten or more.

A user interface allows a contract expert to select a CDF and assign a risk score to it. A subset of CDFs would not have risk scores assigned, since not all CDFs reflect risk allocation. The user interface further allows the contract expert to apply a conditional rule to a CDF-RiskScore pair. Risk scores for any CDF value may be bifurcated to reflect different risk outcomes in different circumstances. For example: Limitation of Liability for Supplier="0" Risk Score IF Supplier Role is Our Company. Further, a risk score data store records all CDF-Risk Score pairs. The risk score data store is deployed to a production contract management system to display contract risk scores to a user associated with the contract. The contract risk scores may be a sum of contract risk values, or the contract risk score may the value of the highest contract risk score for a CDF.

Inputs to the score include external data, including obtaining from public and private sources updating in real time. For example, for the data model variable CounterpartyCountry (which describes the country of origin of a contract counterparty) the credit risk score associate with various countries can be modified in realtime based upon platform monitor news, government databases (for example, countries under embargo, countries identified as rogue states or along a spectrum of business friendliness). As another example, a data model variable KeyPerson could assign a credit risk score for news information about the person—for example, if a key person was the chief executive officer or chief technology officer and there is press release that he/she stepped down or was diagnosed with some disease or is taking a leave of absence, etc. then the score for a particular person is adjusted to reflect that risk.

Figure 19:
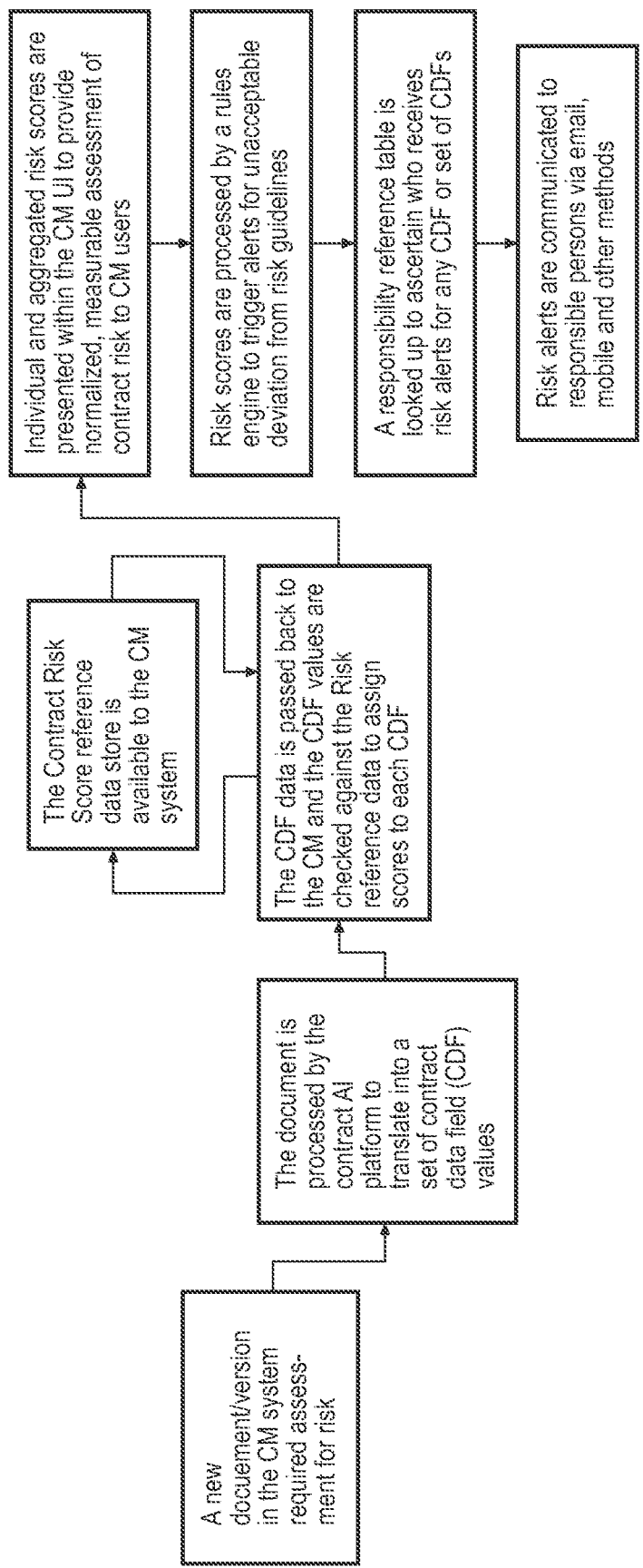
FIG. 19 details steps for creating an alert according to value of a contractual risk score of a contract according to an embodiment.

Further, the contract management system can alert a user when a contract risk score exceeds a threshold value. For example, and referring to FIG. 19, a new document/version in a contract management system is submitted to the contract AI platform 504 and translated into a set of CDFs. The CDF data is then assessed and assigned a contract risk score according to the risk values associated with its various CDFs. A contract risk score reference data store is available to the contract management system. Individual and aggregated contract risk scores are presented within the contract management user interface to provide a normalized, measurable assessment of contract risk to contract management system users. Contract risk scores are processed by a rules engine to trigger alerts for unacceptable deviation from risk guidelines. A responsibility reference table is looked up to ascertain who receives risk alerts for any CDF or set of CDFs. Risk alerts are communicated to responsible persons via email, mobile and other methods.

Using normalized contractual risk, a method of comparing contracts against a universal benchmark is implemented. By building on normalized data and risk models, any one organization can benchmark its contractual outcomes against a set of peers.

In that regard and referring to FIG. 20A, FIG. 20B, FIG. 20C, FIG. 20D, an example model for scoring contractual risk is provided. In the example, a data representation of variables and values from the Contract Data Model are provided. At the top of each column is the Contract Data Model variable and a maximum risk score associated with that variable is provided at the top of an adjacent column. Below the Contract Data Model variable is provided various possible value of the variable paired with risk values associated with that variable value. In determine contract risk, lookups are performed for the value of each contract variable and risk values associated with Contract Data Model variable value are summed and compared to the maximum contract risk score for the variable values, thus providing a relative view of contract risk in comparison to maximum calculated contract risk.

In another version of the data model, a normalized clause model is implemented. One layer of a contractual data model is the assessment of clause types included or excluded from a contract. To facilitate this analysis, a contract or contract transaction must be broken into clauses, and those clauses can then be compared against known clause types for classification. Particularly when machine learning or AI is applied to the problem, a concept of clauses and clause types is an important feature of a training corpus.

One feature of clauses that undermines the clause analysis and comparison is variability in presentation, formatting, and layout, where those variations have no bearing on the substance or underlying words/language.

By applying a normalized clause model to this problem, clauses can be represented, stored, and analyzed in a format that abstracts clause content from clause presentation and formatting. Clauses that are substantively the same but with different formatting are now modeled in a way that removes the false positives regarding whether two clauses are different. A further benefit of abstracting clauses to a normalized, format-free model, is that clauses used with specific formatting in one context can be re-used in different contexts via the systemic application of formatting rules.

An implementation of this normalized clause model represents the clause content as XML, with at least a single content block, an optional heading element, and optional nested subclauses, which are recursive.

Another implementation of this normalized clause model represents the clause as the smallest unit of contract wording that is meaningful "standalone", that is, without a material dependency on content external to itself. In this implementation, a single contractual sentence is represented as a clause where it can be classified as to meaning (and the normalized contract data attributes described above) without reference to other content. Other sentences, for which meaningful classification is dependent on external content, are, in an implementation, combined with that external wording, and the resulting combination (e.g., of two sentences) is modeled as a clause. The combined clause, assuming it is now meaningful "standalone", is then classified as to meaning (using the normalized classification models described previously). A benefit of this sentence-level (or sentence-pair-level) model of a clause is that it facilitates more granular normalization of contract data than approaches which model clauses at the heading or block level. A further benefit is that machine learning methods can be trained to higher levels of performance/accuracy when clauses are modeled at granularity lower than heading or block levels. Training at block and heading level can result in clause content with high levels of variability and inconsistency, which increases the confusion element of machine learning methods. This is particularly problematic when the content in a single paragraph block (or the content associated with a particular heading) contains a large number of sentences.

Another implementation of this normalized clause model enables an improved method of machine-processing of contract data that combines normalization of structured data, normalization of sentence classification, normalization of clauses and normalization of contractual objects Another implementation of the present platform allows for improvements in relationship visibility across a single enterprise, and optionally extended to one or more external or related enterprises, by linking unique party data from one or more contracts to trusted sources of unique legal entity identifiers. This allows a chain of contractual relationships to be created and presented automatically, based upon active contract terms, and supports improved compliance with regulatory compliance requirements, for example, know-your-customer regulations, anti-corruption regulations and anti-money-laundering regulations. In one approach, contractually evidenced relationships between parties can be presented with zero to many degrees of separation, extending relationship analysis to address indirect as well as direct relationships.

Another implementation of the present platform allows for automated document assembly that accepts input for desired contractual terms and utilizes functional language to implement those terms according to desired risk scores measured against a normalized contract model. A recommendation can be further implemented which provides for comparison of an assembled document compared to the normalized contract model to determine addition terms and clauses that would be desirable to improve a contract's risk assessment versus the normalized contract model.

Another implementation of the present platform allows for mobile alerts for contracts and contractual terms which violate certain rules, score high or low in comparison to the normalized contractual model (as described above) or have terms which conflict with an alert or rule set against the normalized clause model. In embodiments, the present platform may provide data and alerts regarding contract models, scoring, automated contract preparation and/or trends over a network to a remote client device, by providing a user interface dashboard to a user for installation on the remote client device; receiving a request from the remote client device to present the data and/or alert; generating an alert from the data or alert that contains a universal resource locator (URL), which specifies the location of the data and/or alert and content related thereto; and transmitting the data and/or alert over a communication channel to the remote client device associated with the user based upon a destination address and transmission schedule that is associated with the remote client device, wherein the data and/or alert activates the user interface dashboard to cause the data or alert to display on the remote client device and to enable connection with the user interface dashboard when the remote client device is activated.

In embodiments of the of the present platform, blockchain technology is incorporated to create a ledger of contract timeline and performance activities. Blockchain is a distributed database that maintains a continuously growing list of ordered records called blocks. Each block contains a timestamp and a link to a previous block. By design, blockchains are inherently resistant to modification of the data—once recorded, the data in a block cannot be altered retroactively. Blockchains are an open, distributed ledger that can record transactions between two parties efficiently and in a verifiable and permanent way. The ledger itself can also be programmed to trigger transactions automatically.

Blockchains are secure by design and an example of a distributed computing system with high byzantine fault tolerance. Decentralized consensus can therefore be achieved with a blockchain. This makes blockchains suitable for the recording of events, such as contractual performance.

Figure 21:
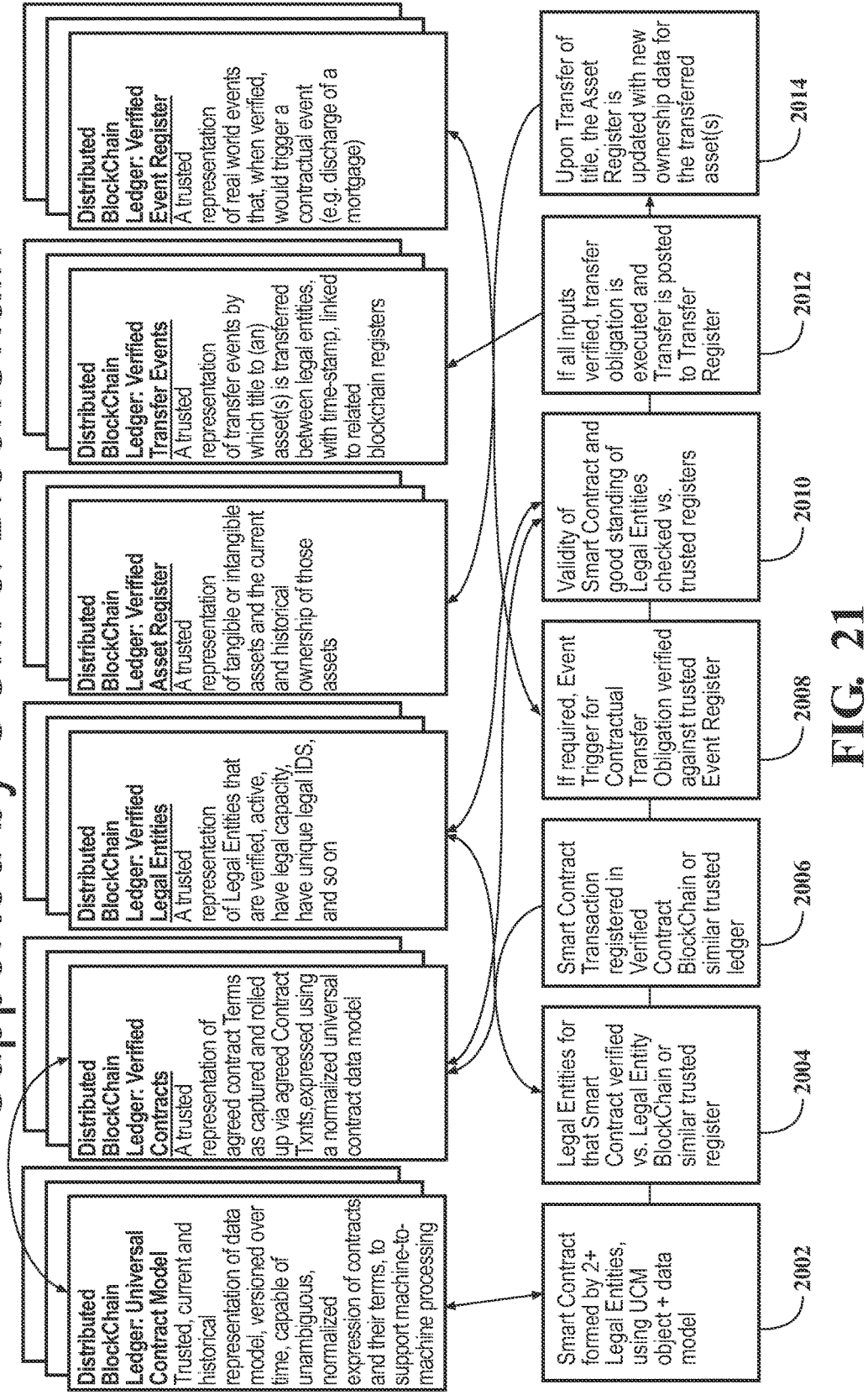
FIG. 21 details steps for a smart contracting app utilizing blockchain and the universal contracting model.

In an embodiment and referring to FIG. 21, the present platform is deployed in a configuration to support contracting events in combination with blockchain technology. By combining the platform (with its universal contract model for describing contracts as objective, normalized point in time structured data) with blockchain technology (to verify important data in the contracting process), a trusted automated approach to forming and performing contractual events (such as contractual transfer of ownership/title for certain assets) is achieved, lowering transaction costs compared to systems with heavy reliance on human processing and verification. Such automated contracting systems can be referred to as "Smart Contract" systems. Smart Contract systems that are implemented without reference to trusted, normalized, machine-processable contracting terms will be limited in their application and scope due to ambiguity and contractual uncertainty. The present platform overcomes these limitations through the innovation of linking the Smart Contract system with a UCM enabled contract platform which does offer universal, normalized, point in time, machine processable contract data and terms.

FIG. 21 describes, in an embodiment, an example of the present platform with Smart Contract capabilities. First, the platform allows two or more contracting parties to form a contract in step 2002, expressed and verified using the UCM model. In an embodiment, the UCM model is recorded in (and can be looked up from) a blockchain register of the objects, terms and data supported by the UCM. Each version of the model is recorded in this UCM Contract Model blockchain with version information, allowing the model to evolve over time and allowing contracting parties to link their contracts to specific version of the UCM.

Second, in a step 2004, the platform includes an optional step of verifying the parties to the contract against a trusted register of legal entities, to ensure that those parties are accurately and uniquely identified, and in good standing (or in the case of natural persons, living and legally competent).

Third, in a step 2006, a final, executed, and valid contract transaction is recorded in a Verified Contract register, itself also optionally implemented as a blockchain ledger. A Verified Contract is a contract that has been recorded and can be verified against the blockchain ledger This register stores contract transactions, and rolled up current state contract objects, together with machine processable terms based on the UCM data model. The Verified Contract register can be queried to ascertain the terms of any contracts it stores, subject to access control and permissions.

Fourth, in an embodiment and in a step 2008, the platform tracks events relevant to the performance of a contract. In the case of contracts with obligations to transfer ownership, the platform may optionally look up a Trusted Event register to ascertain whether a triggering event for execution of a transfer has occurred. Upon verification of a triggering event, in a step 2010, the platform optionally performs a real-time verification that the contract is still valid (e.g., looking up the Verified Contract register) and that the parties are still in good standing and legally competent.

Fifth, in an embodiment and in a step 2012, having verified that a transfer obligation should be executed, the platform executes a transfer of ownership event, and records that transfer in a Transfer Event register, itself optionally implemented as a blockchain ledger. The transfer event is registered in terms reflecting the terms of the Contract. A trusted event is an event that can be verified against the Trusted Event register.

Sixth, in an embodiment and in a step 2014, having successfully recorded the transfer event in the transfer event register, the platform updates an Asset register to record the change of ownership of the asset. The Verified Asset register may, in an embodiment, itself be implemented as a blockchain ledger.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other network types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof, may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A method comprising:
defining in a computer memory an object model containing a structural representation of events and artefacts through which contracts are created, changed, and brought to an end, the object model including contract objects, contract transaction objects and contract document objects, wherein the contract transaction objects correspond to one or more actions associated with a contract;
associating the contract objects with one or more of the contract transaction objects;
associating one or more of the contract document objects with one or more corresponding contract transaction objects, wherein the one or more corresponding contract transaction objects comprise contract data variables having contract data values, and wherein the one or more of the contract document objects each contain a corresponding contract document;
accessing a machine learning classifier comprising a plurality of rule sets that classify natural language words and clauses of contracts, the plurality of rule sets having been formed via training a machine learning algorithm on contract documents, contract clauses, contract sentences and contract phrases, the plurality of rule sets comprising document rule sets, contract transaction rule sets, and clause classification rule sets, the machine learning classifier further comprising one or more of industry specific rule sets or customer specific rule sets;
applying the plurality of rule sets to one or more words of each corresponding contract document to identify one or more core attributes of the one or more words pertaining to details of the corresponding contract document;
linking the identified one or more core attributes and the one or more words of each corresponding contract document to an applicable object of the object model;
determining prevailing terms of each corresponding contract document by evaluating one or more child contract transaction objects to build a single set of contract data variables and values;
evaluating the contract data variables and assigning a contract data risk value to one or more of the contract data values; and
alerting a user when a contract risk exceeds a threshold value.

2. The method of claim 1, wherein the one or more core attributes comprise one or more of legal classifications subject classifications, party directions, timing contingencies, conditionalities, or contextual dependencies.

3. The method of claim 1, wherein associating the contract objects with one or more of the contract transaction objects comprises associating the contract objects with one or more contract transaction objects corresponding to the one or more actions associated with the contract, wherein a type of at least one of the contract transaction objects is one of: Create Transaction, Terminate Transaction, Amend Transaction, Order Transaction, Renew Transaction, Assign Transaction, or Novate Transaction.

4. The method of claim 3, wherein the object model further includes project objects, user objects, group objects, workflow objects, organization objects, legal entity objects, and product objects.

5. The method of claim 1, further comprising transforming each corresponding contract document into a collection of single sentences, assigning a legal classification to each of the single sentences, and assigning a confidence score to the legal classification; and presenting each of the single sentences with the confidence score below a predetermined threshold for verification, the verification comprising receiving a correction and feeding the correction to the machine learning algorithm.

6. The method of claim 5, wherein the legal classification comprises one of an obligation, a right, a representation, an act, or a definition.

7. The method of claim 1, wherein applying the plurality of rule sets to one or more words of each corresponding contract document comprises evaluating sentence pairs of each corresponding contract document.

8. The method of claim 1, further comprising storing the prevailing terms of each corresponding contract document in the contract objects associated with each corresponding contract document in XML format.

9. The method of claim 1, further comprising storing the prevailing terms of each corresponding contract document in the contract objects associated with each corresponding contract document in JSON format.

10. The method of claim 1, further comprising storing the prevailing terms of each corresponding contract document in the contract objects associated with each corresponding contract document in a triple store format.

11. One or more non-transitory computer-readable storage media storing instructions operable when executed by one or more processors to cause performance of:
defining in a computer memory an object model containing a structural representation of events and artefacts through which contracts are created, changed, and brought to an end, the object model including contract objects, contract transaction objects and contract document objects, wherein the contract transaction objects correspond to one or more actions associated with a contract;

associating the contract objects with one or more of the contract transaction objects;

associating one or more of the contract document objects with one or more corresponding contract transaction objects, wherein the one or more corresponding contract transaction objects comprise contract data variables having contract data values, and wherein the one or more of the contract document objects each contain a corresponding contract document;

accessing a machine learning classifier comprising a plurality of rule sets that classify natural language words and clauses of contracts, the plurality of rule sets having been formed via training a machine learning algorithm on contract documents, contract clauses, contract sentences and contract phrases, the plurality of rule sets comprising document rule sets, contract transaction rule sets, and clause classification rule sets, the machine learning classifier further comprising one or more of industry specific rule sets or customer specific rule sets;

applying the plurality of rule sets to one or more words of each corresponding contract document to identify one or more core attributes of the one or more words pertaining to details of the corresponding contract document;

linking the identified one or more core attributes and the one or more words of each corresponding contract document to an applicable object of the object model;

determining prevailing terms of each corresponding contract document by evaluating one or more child contract transaction objects to build a single set of contract data variables and values;

evaluating the contract data variables and assigning a contract data risk value to one or more of the contract data values; and alerting a user when a contract risk exceeds a threshold value.

12. The one or more non-transitory computer-readable storage media of claim 11, wherein the one or more core attributes comprise one or more of legal classifications, subject classifications, party directions, timing contingencies, conditionalities, or contextual dependencies.

13. The one or more non-transitory computer-readable storage media of claim 11, wherein associating the contract objects with one or more of the contract transaction objects comprises associating the contract objects with one or more contract transaction objects corresponding to the one or more actions associated with the contract, wherein a type of at least one of the contract transaction objects is one of: Create Transaction, Terminate Transaction, Amend Transaction, Order Transaction, Renew Transaction, Assign Transaction, or Novate Transaction.

14. The one or more non-transitory computer-readable storage media of claim 11, wherein the object model further includes project objects, user objects, group objects, workflow objects, organization objects, legal entity objects, and product objects.

15. The one or more non-transitory computer-readable storage media of claim 11, further comprising transforming each corresponding contract document into a collection of single sentences, assigning a legal classification to each of the single sentences, and assigning a confidence score to the legal classification; and presenting each of the single sentences with the confidence score below a predetermined threshold for verification, the verification comprising receiving a correction and feeding the correction to the machine learning algorithm.

16. The one or more non-transitory computer-readable storage media of claim 15, wherein the legal classification comprises one of an obligation, a right, a representation, an act, and a definition.

17. The one or more non-transitory computer-readable storage media of claim 11, wherein applying the plurality of rule sets to one or more words of each corresponding contract document comprises evaluating sentence pairs of each corresponding contract document.

18. The one or more non-transitory computer-readable storage media of claim 11, further comprising storing the prevailing terms of each corresponding contract document in the contract objects associated with each corresponding contract document in XML format.

19. The one or more non-transitory computer-readable storage media of claim 11, further comprising storing the prevailing terms of each corresponding contract document in the contract objects associated with each corresponding contract document in JSON format.

20. The one or more non-transitory computer-readable storage media of claim 11, further comprising storing the prevailing terms of each corresponding contract document in the contract objects associated with each corresponding contract document in a triple store format.

* * * * *